(12) United States Patent
Tang

(10) Patent No.: US 11,418,062 B2
(45) Date of Patent: Aug. 16, 2022

(54) WIRELESS POWER TRANSFER SYSTEMS HAVING CONCENTRIC COILS

(71) Applicant: Indigo Technologies, Inc., Woburn, MA (US)

(72) Inventor: Sai Chun Tang, Auburndale, MA (US)

(73) Assignee: Indigo Technologies, Inc., Woburn, MA (US)

( * ) Notice: Subject to any disclaimer, the term of this patent is extended or adjusted under 35 U.S.C. 154(b) by 0 days.

(21) Appl. No.: 16/964,251

(22) PCT Filed: Jan. 28, 2019

(86) PCT No.: PCT/US2019/015352
§ 371 (c)(1),
(2) Date: Jul. 23, 2020

(87) PCT Pub. No.: WO2019/148070
PCT Pub. Date: Aug. 1, 2019

(65) Prior Publication Data
US 2021/0044150 A1    Feb. 11, 2021

Related U.S. Application Data

(60) Provisional application No. 62/622,288, filed on Jan. 26, 2018.

(51) Int. Cl.
*H02J 50/00*   (2016.01)
*H02J 50/12*   (2016.01)
(Continued)

(52) U.S. Cl.
CPC .............. *H02J 50/12* (2016.02); *H01F 27/28* (2013.01); *H02J 50/402* (2020.01)

(58) Field of Classification Search
CPC .............. H02J 50/00; H02J 50/12; H04B 5/00
See application file for complete search history.

(56) References Cited

U.S. PATENT DOCUMENTS 8,598,743 B2   12/2013   Hall et al.
8,653,697 B1    2/2014   Hunter
(Continued)

OTHER PUBLICATIONS

Arakawa et al., "Optimizing Wireless Power Transfer From Multiple Transmit Coils." IEEE Access 6 (2018): 23828-23838.
(Continued)

*Primary Examiner* — Adi Amrany
(74) *Attorney, Agent, or Firm* — Smith Baluch LLP

(57) ABSTRACT

A conventional wireless power transfer (WPT) system based on resonant inductive coupling typically operates at a peak power efficiency at the expense of a energy transfer rate. Impedance matching circuits can increase the energy transfer rate, but tend to increase the complexity, form factor, and weight of the WPT system. To overcome these limitations, a WPT system is described herein that includes a resonant circuit with integrated impedance matching. The resonant circuit includes a first coil, a first capacitor in series with the first coil, a second coil in series with the first coil and the first capacitor, and a second capacitor in parallel with the first coil and the first capacitor. The inductor coils and capacitances are tailored to increase the voltage gain and, thus, the energy transfer rate. The inductor coils also transmit or receive power, thus increasing the energy transfer rate and the power efficiency.

23 Claims, 16 Drawing Sheets

(51) Int. Cl.
H02J 50/40 (2016.01)
H01F 27/28 (2006.01)

(56) References Cited

U.S. PATENT DOCUMENTS

| | | | |
|---|---|---|---|
| 9,129,743 B1 | 9/2015 | Hunter et al. | |
| 9,404,950 B2 | 8/2016 | Lafontaine et al. | |
| 9,472,336 B2* | 10/2016 | Jung | H01F 38/14 |
| 9,726,701 B2 | 8/2017 | Lafontaine et al. | |
| 9,746,506 B2 | 8/2017 | Lafontaine et al. | |
| 10,101,370 B2 | 10/2018 | Lafontaine et al. | |
| 2012/0091820 A1 | 4/2012 | Campanella et al. | |
| 2012/0248882 A1 | 10/2012 | Urano | |
| 2013/0033118 A1 | 2/2013 | Karalis et al. | |
| 2013/0088194 A1 | 4/2013 | Hunter et al. | |
| 2013/0270921 A1 | 10/2013 | Boys et al. | |
| 2014/0125140 A1 | 5/2014 | Widmer et al. | |
| 2014/0167704 A1 | 6/2014 | Lafontaine et al. | |
| 2015/0015197 A1* | 1/2015 | Mi | B60L 53/12 320/108 |
| 2015/0228402 A1* | 8/2015 | Zhong | H02J 50/40 307/104 |
| 2015/0303742 A1* | 10/2015 | Matsumoto | H02J 50/12 307/104 |
| 2016/0072306 A1 | 3/2016 | Tsuda et al. | |
| 2016/0261148 A1* | 9/2016 | Riehl | H01F 38/14 |
| 2016/0380365 A1* | 12/2016 | Helbers | H04B 5/02 455/73 |
| 2017/0302110 A1* | 10/2017 | Riehl | H02J 50/60 |
| 2018/0076668 A1* | 3/2018 | Parimi | H02J 50/40 |
| 2018/0233961 A1* | 8/2018 | Hu | H02J 7/025 |
| 2018/0269726 A1* | 9/2018 | Abdolkhani | H02J 50/10 |
| 2019/0204369 A1 | 7/2019 | Lafontaine et al. | |
| 2019/0245384 A1* | 8/2019 | Chandrakasan | H03K 7/08 |
| 2019/0312460 A1* | 10/2019 | Van Boheemen | B60L 53/12 |
| 2020/0044491 A1* | 2/2020 | Qiu | H02J 50/12 |
| 2021/0083509 A1* | 3/2021 | Stingu | G01R 33/10 |

OTHER PUBLICATIONS

Chaidee et al., "Influence of distance and frequency variations on wireless power transfer." Electrical Engineering/Electronics, Computer, Telecommunications and Information Technology (ECTI-CON), 2017 14th International Conference on. IEEE, 2017. 4 pages.
Duong et al., "A dynamically adaptable impedance-matching system for midrange wireless power transfer with misalignment." Energies 8.8 (2015): 7593-7617.
Fang et al., "Practical considerations of series-series and series-parallel compensation topologies in wireless power transfer system application." Emerging Technologies: Wireless Power Transfer (WoW), 2017 IEEE PELS Workshop on. IEEE, 2017. 5 pages.
Huang et al., "Frequency splitting phenomena of magnetic resonant coupling wireless power transfer." IEEE Transactions on Magnetics 50.11 (2014): 1-4.
Huang et al., "Frequency, impedance characteristics and HF converters of two-coil and four-coil wireless power transfer." IEEE Journal of Emerging and selected topics in Power Electronics 3.1 (2015): 177-183.
International Search Report and Written Opinion in International Patent Application No. PCT/US19/15352 dated Apr. 2, 2019, 11 pages.
Iordache et al., "Circuit analysis of frequency splitting phenomena in wireless power transfer systems." Advanced Topics in Electrical Engineering (ATEE), 2015 9th International Symposium on. IEEE, 2015. 6 pages.
Iordache et al., "On exact circuit analysis of frequency splitting and bifurcation phenomena in wireless power transfer systems." Signals, Circuits and Systems (ISSCS), 2015 International Symposium on. IEEE, 2015. 4 pages.
Kurs et al., "Simultaneous mid-range power transfer to multiple devices." Applied Physics Letters 96.4 (2010): 044102. 4 pages.
Li et al., "Frequency splitting research of series-parallel type magnetic coupling resonant wireless power transfer system." 2018 13th IEEE Conference on Industrial Electronics and Applications (ICIEA). IEEE, 2018. 4 pages.
Liao et al., "Design of LCC impedance matching circuit for wireless power transfer system under rectifier load." CPSS Transactions on Power Electronics and Applications 2.3 (2017): 237-245.
Luo et al., "A frequency-tracking and impedance-matching combined system for robust wireless power transfer." International Journal of Antennas and Propagation 2017 (2017). 14 pages.
Lyu et al., "A method of using nonidentical resonant coils for frequency splitting elimination in wireless power transfer." IEEE Transactions on Power Electronics 30.11 (2015): 6097-6107.
Mou et al., "Wireless power transfer: Survey and roadmap." Vehicular Technology Conference (VTC Spring), 2015 IEEE 81st. IEEE, 2015. 13 pages.
Narayanamoorthi et al., "Frequency Split Elimination of Short Range Wireless Power Transfer System by Active Matching Tuning Circuit." Indian Journal of Science and Technology 9.42 (2016). 6 pages.
Narayanamoorthi et al., "Frequency Splitting based Wireless Power Transfer and Simultaneous Propulsion Seneration to Multiple Micro-Robots." IEEE Sensors Journal (2018). 10 pages.
Narayanamoorthi et al., "Frequency Splitting Elimination and Cross-Coupling Rejection of Wireless Power Transfer to Multiple Dynamic Receivers." Applied Sciences 8.2 (2018): 179. 19 pages.
Nasr et al., "Precise analysis of frequency splitting phenomenon of magnetically coupled wireless power transfer system." Microwave Conference (APMC), 2017 IEEE Asia Pacific. IEEE, 2017. 6 pages.
Nguyen et al., "Splitting frequency diversity in wireless power transmission." IEEE Transactions on Power Electronics 30.11 (2015): 6088-6096.
Qi et al., "Study on the influence of frequency splitting of a WPT system on high frequency conducted EMI." 2017 Sixth Asia-Pacific Conference on Antennas and Propagation (APCAP). IEEE, 2017. 3 pages.
Schneider, "Wireless power transfer for light-duty plug-in/electric vehicles and alignment methodology." SAE International J2954 Taskforce (2016). 115 pages.
Schormans et al., "Frequency splitting analysis and compensation method for inductive wireless powering of implantable biosensors." Sensors 16.8 (2016): 1229. 14 pages.
Tang et al., "Evaluation of the shielding effects on printed-circuit-board transformers using ferrite plates and copper sheets." IEEE Transactions on Power Electronics 17.6 (2002): 1080-1088.
Wang et al., Design and control of a 3 kW wireless power transfer system for electric vehicles. Energies 9.1 (2016): 10. 18 pages.
Waters et al., "Adaptive impedance matching for magnetically coupled resonators." PIERS Proceedings. 2012. 8 pages.
Waters et al., "Simultaneously tuning and powering multiple wirelessly powered devices." Wireless Power Transfer Conference (WPTC), 2015 IEEE. IEEE, 2015. 4 pages.
Zhang et al., "Frequency splitting analysis of two-coil resonant wireless power transfer." IEEE Antennas and Wireless Propagation Letters 13 (2014): 400-402.
Extended European Search Report and Written Opinion in European Patent Application No. 19744589.3 dated Oct. 7, 2021, 8 pages.

* cited by examiner

WIRELESS POWER TRANSFER SYSTEMS HAVING CONCENTRIC COILS

CROSS-REFERENCE TO RELATED PATENT APPLICATION

This application is a national-stage application, under 35 U.S.C. § 371, of International Application No. PCT/US2019/015352, filed on Jan. 28, 2019, and entitled "Wireless Power Transfer Systems with Integrated Impedance Matching and Methods for Using the Same," which in turn claims priority, under 35 U.S.C. § 119(e), to U.S. Application No. 62/622,288, filed on Jan. 26, 2018, and entitled "Wireless Power Transfer System (WPTS) with Dual Coils", each of which is incorporated herein by reference in its entirety.

BACKGROUND

A wireless power transfer (WPT) system transfers power from a transmitter to a receiver based on the emission and absorption of electromagnetic waves. The transmitter and the receiver in a WPT system do not need to be physically connected, thus eliminating the need for wiring when charging and/or powering electronic devices. WPT systems have utility for a broad range of applications including, but not limited to, charging batteries in electric vehicles, trains, or buses; powering home appliances, such as lighting, televisions, and climate control devices; charging autonomous robots or drones; and powering biomedical devices, especially devices implanted in the human body.

Over the years, various types of WPT systems have been developed, which are differentiated, in part, by how the transmitter is coupled to the receiver. For instance, WPT systems have been developed based on inductive coupling, capacitive coupling, and magnetodynamic coupling, which have different advantages and disadvantages in terms of the operating frequency, low power/high power compatibility, and operating distance. WPT systems based on inductive coupling are among the most widely used in commercial applications, especially for applications where higher energy transfer rates (also referred to as "power level") are preferable (e.g., greater than 1 kW).

SUMMARY

A conventional WPT system based on resonant inductive coupling typically exhibits a peak energy transfer rate and a peak power efficiency at different operating frequencies. This is called the frequency splitting effect. As a result of the frequency splitting effect, a conventional WPT system cannot operate at both the peak energy transfer rate and the peak power efficiency simultaneously. In some conventional WPT systems, impedance matching circuits are used to partially compensate a reduction in the energy transfer rate caused by the frequency splitting effect when operating at the resonant frequency. However, conventional matching circuits typically include large, bulky circuit components (e.g. inductors, capacitors) that increase the complexity, size, and weight of the WPT system.

The present disclosure is thus directed to a wireless power transfer (WPT) system that utilizes a resonant circuit with integrated impedance matching. The resonant circuit includes inductor coils and capacitors configured to compensate for the frequency splitting effect by increasing the voltage gain of the transmitter and/or the receiver, thus increasing the energy transfer rate. By integrating the voltage boosting functionality into the resonant circuit, the high voltage components in the WPT system are confined to the circuitry used to transmit or receiver energy. This substantially reduces the voltage (e.g., from 400 V in conventional electric vehicles (EVs) to less than 67 V) used in other electrical components coupled to the WPT system, such as a transmitter driving circuit, a battery, and any wiring used for electrical connections, thus improving the overall safety of the WPT system.

The inductor coils are also used to wirelessly exchange energy between the transmitter and the receiver, increasing both the energy transfer rate and the power efficiency. In this manner, the resonant circuit enables the WPT system to operate at a peak power efficiency and a higher energy transfer rate than conventional systems. Furthermore, the integrated functionality provided by the resonant circuit reduces the number of discrete components used in the WPT system, enabling a smaller form factor and lighter weight system. Methods for using the WPT system are also described in the present disclosure.

In one exemplary design, a wireless power receiver includes a resonant circuit. The resonant circuit includes a first coil and a first capacitor coupled in series to the first coil. The resonant circuit also includes a second coil, coupled in series to the first coil and the first capacitor, and a second capacitor, coupled in parallel to the first coil and the first capacitor. The first coil and the second coil may both provide impedance matching to increase the voltage gain of the resonant circuit at a desired operating frequency. The first coil and the second coil are also configured to receive energy from one or more coils in a transmitter. The wireless power receiver is also electrically coupled to a load that receives power from the transmitter.

An exemplary wireless power transmitter may have a substantially similar design to the wireless power receiver described above with the primary difference being the replacement of the load with a power source. The transmitter may also include a resonant circuit with inductor coils and capacitors configured to increase the voltage gain of the transmitter. The inductor coils in the transmitter may also transmit energy to the first coil/second coil in the receiver.

A WPT system may thus include one or both of the wireless power receiver and the wireless power transmitter. In one exemplary design, the inductor coils in both the transmitter and the receiver may be magnetically coupled, thus increasing the energy transfer rate and the power efficiency. Additionally, the resonant frequency of the transmitter and/or the receiver may be tuned to match the operating frequency of the WPT system in order to increase the power efficiency.

An exemplary wireless power receiver may include a resonant circuit to receive power from a wireless power transmitter via wireless magnetic resonance charging at a voltage gain of about 1 and an efficiency of at least 95% at a resonant frequency between about 80 kHz and about 90 kHz. The resonant circuit may include a first coil, a second coil coupled in series with the first coil, the first coil and the second coil configure to receive the power, a first capacitor coupled in series with the first coil, and a second capacitor coupled in parallel with the first coil and the first capacitor. The first coil and the second coil may be configured to receive energy from a third coil and a fourth coil in the wireless power transmitter. The first coil may have an inductance of about 0.1 pH to about 100 pH, the first capacitor may have a capacitance of about 0.01 g to about 100 g, the second coil may have an inductance of about 0.1 pH to about 100 pH, and the second capacitor may have a capacitance of about 0.01 g to about 100 g. In some designs, the first coil may have an inductance of about 1 µH to about 20 pH, the first capacitor may have a capacitance of about 0.05 g to about 2 µF, the second coil may have an inductance of about 1 µH to about 20 pH, and the second capacitor may have a capacitance of about 0.05 g to about 2 µF.

An exemplary method of transferring power wirelessly may include receiving the power, from at least one coil, with a first coil and a second coil in series with the first coil at a resonant frequency between about 80 kHz and about 90 kHz, a voltage gain of about 1.0, and an efficiency of at least 95%. The method may further include positioning the first coil within about 50 mm of the at least one coil. The at least one coil in the method may include a third coil matching the first coil and a fourth coil in series with the third coil and matching the second coil. The method may further include the step of running a first current through the third coil and the fourth coil where the first current induces a second current running through the first coil and the second coil. The phase difference between the first current at the third coil and the first current at the fourth coil may be less than about 20 degrees or less than about 10 degrees.

Another exemplary wireless power receiver may include a first coil, a second coil in series with the first coil, a first capacitor in series with the first coil and the second coil, and a second capacitor in parallel with the first coil and the first capacitor. The resonant frequency of the wireless power receiver may be about 87 kHz. The wireless power receiver may have a voltage gain of about 1 over a band from about 80 kHz to about 90 kHz. The wireless power receiver may have a power transfer efficiency of at least 95% over a band from about 80 kHz to about 90 kHz. The first coil may be concentric with the second coil. The first coil may be co-planar with the second coil. The first coil may be stacked on the second coil. The first coil may be a first flat spiral coil and the second coil may be a second flat spiral coil. The first coil and the second coil may each have an outer diameter equal to or less than 220 mm. The second coil may be connected in series between the first coil and the first capacitor. The first capacitor my be connected series between the first coil and the second coil. The first coil may have an inductance of about 0.1 µH to about 100 µH, the first capacitor may a capacitance of about 0.01 µF to about 100 µF, the second coil may have an inductance of about 0.1 µH to about 100 µH, and the second capacitor may have a capacitance of about 0.01 µF to about 100 µF. In some designs, the first coil may have an inductance of about 1 µH to about 20 µH, the first capacitor may have a capacitance of about 0.05 µF to about 2 µF, the second coil may have an inductance of about 1 µH to about 20 µH, and the second capacitor may have a capacitance of about 0.05 µF to about 2 µF.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

A conventional WPT system based on inductive coupling typically includes an inductor coil in the transmitter and the receiver, respectively, which exchange power via magnetic field coupling. In order to increase the energy transfer rate, power efficiency, and range of operation, the transmitter and the receiver in the WPT system are often configured to operate at resonance.

Figure 1A:
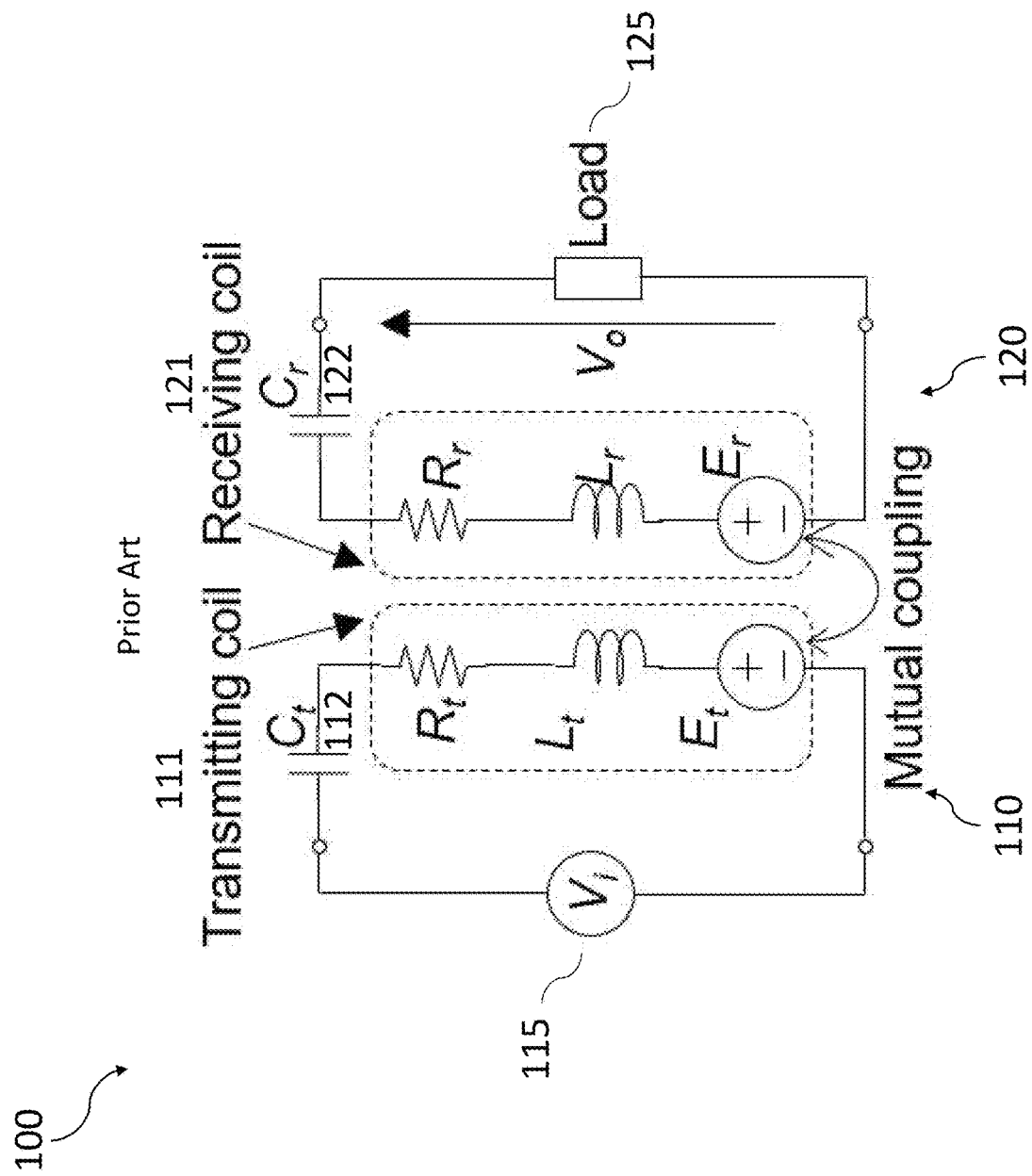
FIG. 1A shows a circuit diagram of a conventional wireless power transfer (WPT) system.

FIG. 1A shows a conventional WPT system 100 with resonant inductive coupling. The WPT system 100 includes a transmitter 110 and a receiver 120. The transmitter 110 includes an energy coupling coil 111 and a resonant capacitor 112 ($C_t$) coupled electrically in series to a power source 115 ($V_i$). The receiver 120 similarly includes an energy coupling coil 121 and a resonant capacitor 122 ($C_r$) coupled electrically in series to a load 125. The energy coupling coils 111 (121) are represented by the winding resistance $R_t$ ($R_r$) and the inductance $L_t$ ($L_r$).

The power source 115 supplies a voltage, which drives an electric current through the energy coupling coil 111 thus generating a magnetic field. The magnetic field may then be absorbed, at least in part, by the energy coupling coil 121 creating an electric current that then flows through the load 125. In this manner, electric power is transferred wirelessly between the transmitter 110 and the receiver 120. The resonant capacitors 112 and 122 are typically tailored to substantially reduce the input and output impedance, thus increasing the energy transfer rate between the transmitter 110 and the receiver 120.

The power efficiency of a typical WPT system may be defined as follows, $$\eta = P_R/P_T \quad (1)$$

where $\eta$ is the power efficiency, $P_R$ is the total energy received by the energy coupling coil 121 in the receiver 120 over a time interval $\Delta t$, and $P_T$ is the total energy transmitted by the energy coupling coil 111 in the transmitter 110 over the time interval $\Delta t$. The energy transfer rate may be defined as the power, or the rate of energy transfer per unit time, received by the energy coupling coil 121 in the receiver 120. The magnitude of the energy transfer rate thus depends, in part, on the power transmitted by the energy coupling coil 111. The energy transfer rate is proportional to the voltage gain (defined as the ratio of the output voltage $V_o$ at the load 125 and the input voltage $V_i$ at the power source 115) between the transmitter 110 and the receiver 120. Thus, an increase in the energy transfer rate is correlated to an increase in the voltage gain.

The coupling between the energy coupling coils 111 and 121 may be characterized by a magnetic coupling coefficient, k. Generally, k may increase by increasing the diameter of the energy coupling coils 111 and 121 and/or reducing the gap or distance between the energy coupling coils 111 and 121. When the magnetic coupling coefficient k increases and/or the gap between the energy coupling coils 111 and 121 decreases, the power efficiency typically increases. Thus, the energy coupling coil 121 can receive more of the energy transmitted by the energy coupling coil 111 due to the stronger coupling. However, under overcoupled conditions, the energy transfer rate typically decreases, which indicates a reduction in the amount of energy transmitted by the energy coupling coil 111.

The induced voltage at the energy coupling coil 111 in the transmitter 110, caused by the energy coupling coil 121 in the receiver 120, increases as the coupling between the transmitter 110 and the receiver 120 increases. This induced voltage has a polarity opposite to the applied voltage from the power source 115, thus impeding the input current flowing through the transmitter 110 resulting in a reduction in the voltage gain and the energy transfer rate. This undesirable voltage is proportional to the electric current flowing through the energy coupling coil 121 and the magnetic coupling coefficient k and inversely proportional to the gap size. For example, when the WPT system 100 operates at the resonant frequency and the gap between the energy coupling coils 111 and 121 decreases, the electric current in the energy coupling coil 121 of the receiver 120 increases. This, in turn, induces a larger voltage at the energy coupling coil 111, thus reducing the voltage gain and the energy transfer rate. In other words, making gap between the coils increases power transfer efficiency and decreases the energy transfer rate.

Referring to the WPT system 100 shown in FIG. 1A, the WPT system 100 may be configured to support a resonant frequency in the series LC circuits formed by the energy coupling coil 111 and resonant capacitor 112 (and the energy coupling coil 121 and the resonant capacitor 122), which may be tuned to the operating frequency of the WPT system 100. As shown in FIG. 1A, $E_t$ represents the voltage at the transmitting coil induced by the magnetic field generated by the receiving coil current. $E_r$ represents the voltage at the receiving coil induced by the magnetic field generated by the transmitting coil current. As described above, stronger coupling (e.g., a higher magnetic coupling coefficient k) may increase the power efficiency of the WPT system 100. However, stronger coupling also leads to a stronger frequency splitting effect.

Figure 1B:
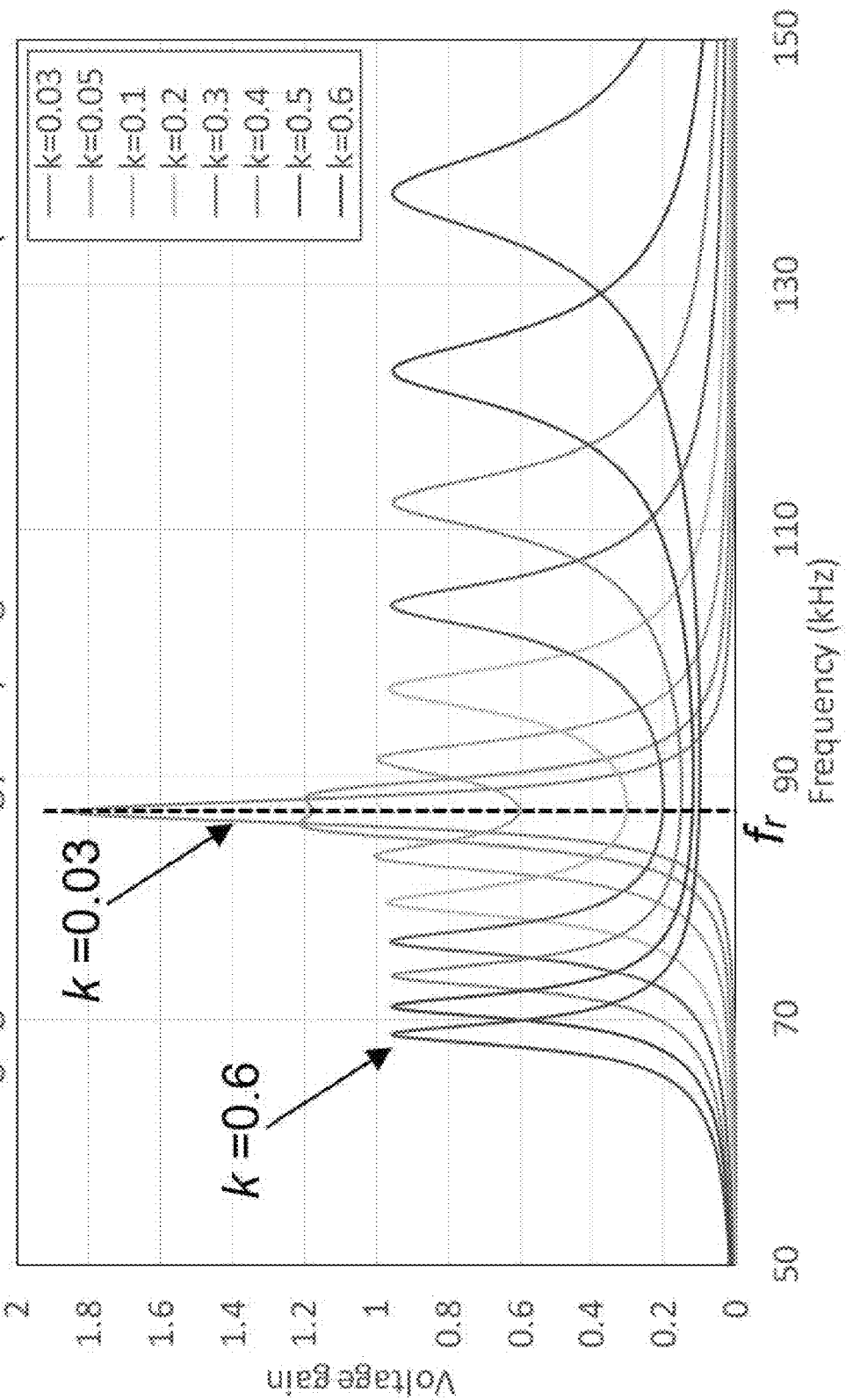
FIG. 1B shows a chart of the voltage gain versus frequency for the conventional WPT system of FIG. 1A.
Figure 1C:
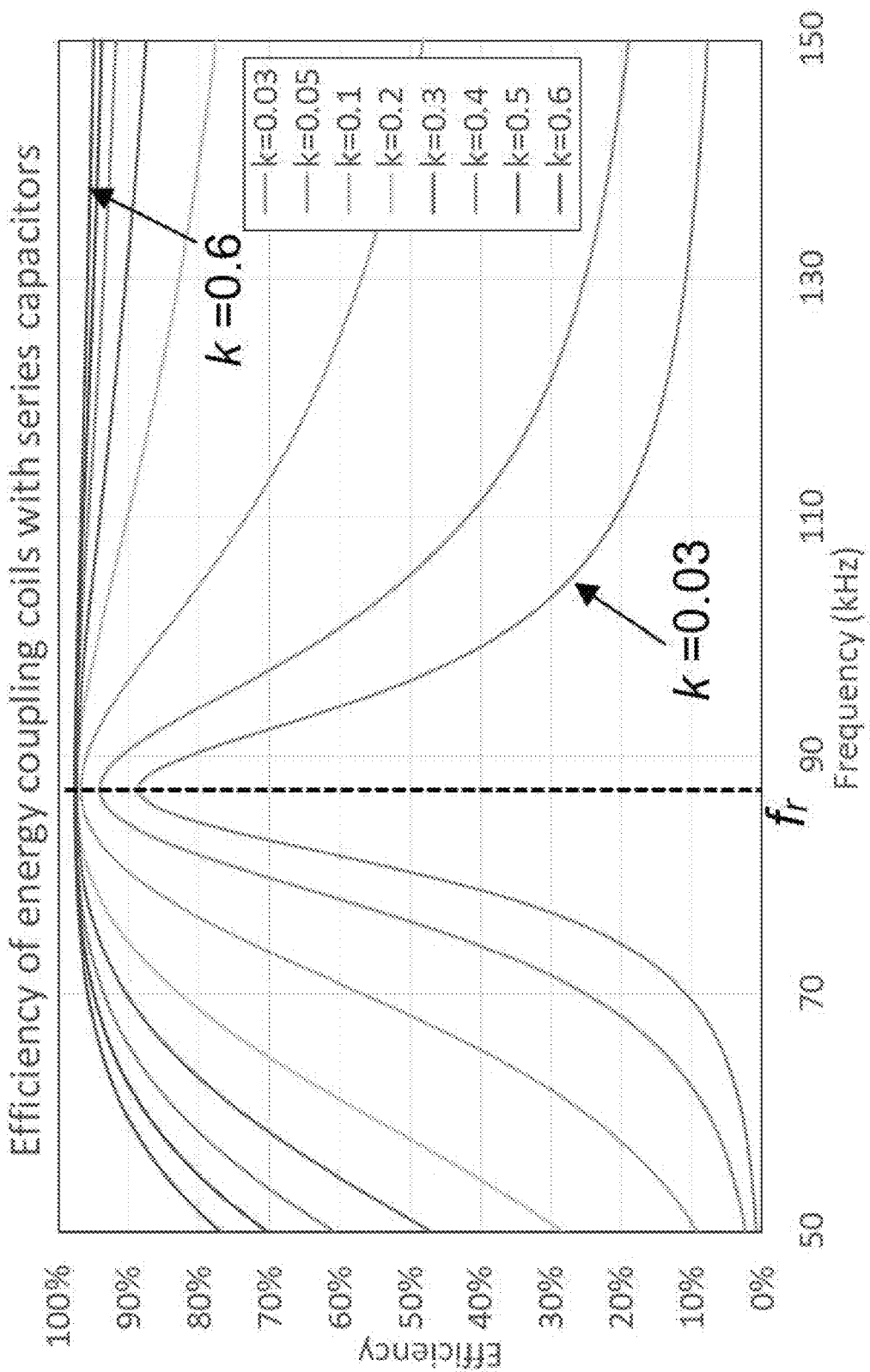
FIG. 1C show a chart of the power efficiency versus frequency for the conventional WPT system of FIG. 1A.

FIGS. 1B and 1C show the voltage gain and the power efficiency of the WPT system 100, respectively, at various values of the magnetic coupling coefficient k. In FIG. 1B, the voltage gain exhibits two peaks, which indicates the resonant mode splits into an even and odd mode. As shown, the even/odd modes shift to smaller/larger frequencies relative to the resonant frequency, $f_r$, as the coupling coefficient k increases, which leads to a reduction in the voltage gain at the resonant frequency. In FIG. 1C, the power efficiency exhibits a peak at the resonant frequency, which increases as the coupling coefficient increases. The power efficiency tends to decrease at the off-resonant frequencies corresponding to the even and odd modes. As a result, the power efficiency and the energy transfer rate, as indicted by the voltage gain, exhibit peak values that occur at different frequencies. Thus, the conventional WPT system 100 cannot operate at both the peak energy transfer rate and the peak power efficiency simultaneously due to this frequency splitting effect.

Several approaches have been developed in an effort to overcome the frequency splitting effect described above in the WPT system 100. In one example, the energy coupling coils 111 and 121 are intentionally configured to have different electrical properties in order to reduce the magnetic coupling coefficient k, thus reducing the induced voltage in the energy coupling coil 111. Specifically, the diameter of the energy coupling coil 121 was chosen to be substantially smaller or larger than the diameter of the energy coupling coil 111 such that the ratio of the diameters deviates substantially from unity. However, reducing the magnetic coupling coefficient k in this manner reduces the energy transfer rate and the power efficiency of the WPT system.

In another example, an active matching tuning circuit is integrated into the transmitter 110. The active matching tuning circuit adjusts the resonant frequency of the transmitter 110 to match the operating frequency of the WPT system 100, thus enabling the WPT system 100 to operate at the peak power efficiency. However, the voltage gain and thus the energy transfer rate are sacrificed in this design due to the frequency splitting effect. Additionally, switches and capacitors rated for high-voltage and high-current operation are used in the resonant circuit, which can substantially increase the cost, size, weight, complexity, and power loss of the WPT system 100. Thus, this approach is not desirable, especially for high power applications such as electric vehicle (EV) battery charging.

In yet another example, a frequency tracking method is used where the operating frequency of the WPT system 100 is instead adjusted to match the resonant frequency in order to match the peak power efficiency. This approach does not include the use of variable capacitors or arrays of high-power rating tuning capacitors and switches, thus greatly simplifying the WPT system 100 and reducing cost. However, the voltage gain and thus the energy transfer rate are again sacrificed in this design due to the frequency splitting effect. Furthermore, this approach may not be feasible in applications where the operating frequency is constrained to a particular range that does not include the resonant frequency. For example, the WPT system 100 for an EV battery charging may operate at a frequency ranging between 81.38 kHz and 90 kHz with a resonant frequency less than 81.38 kHz or greater than 90 kHz.

Figure 2A:
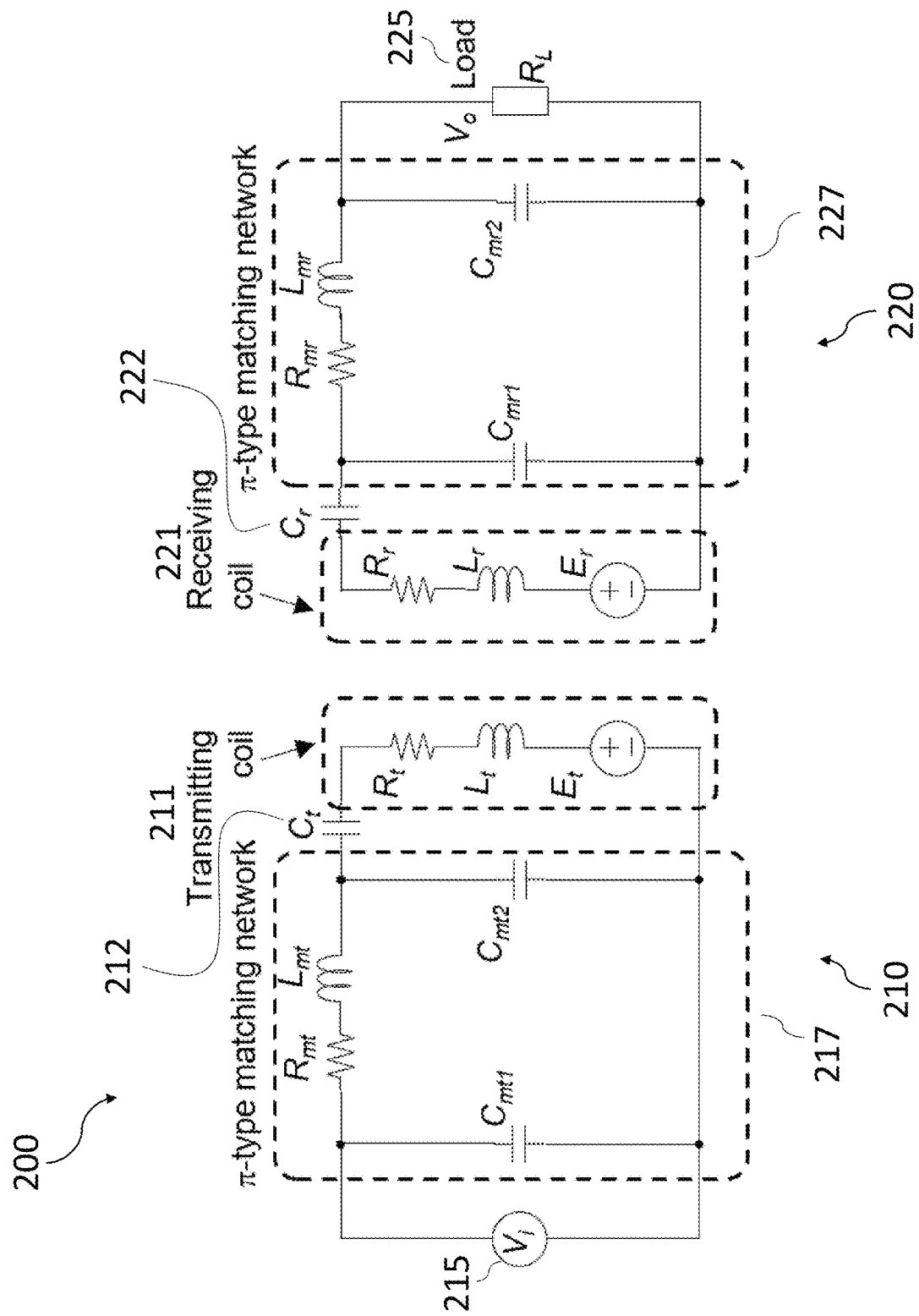
FIG. 2A shows a circuit model of a conventional WPT system with a π matching network.
Figure 2B:
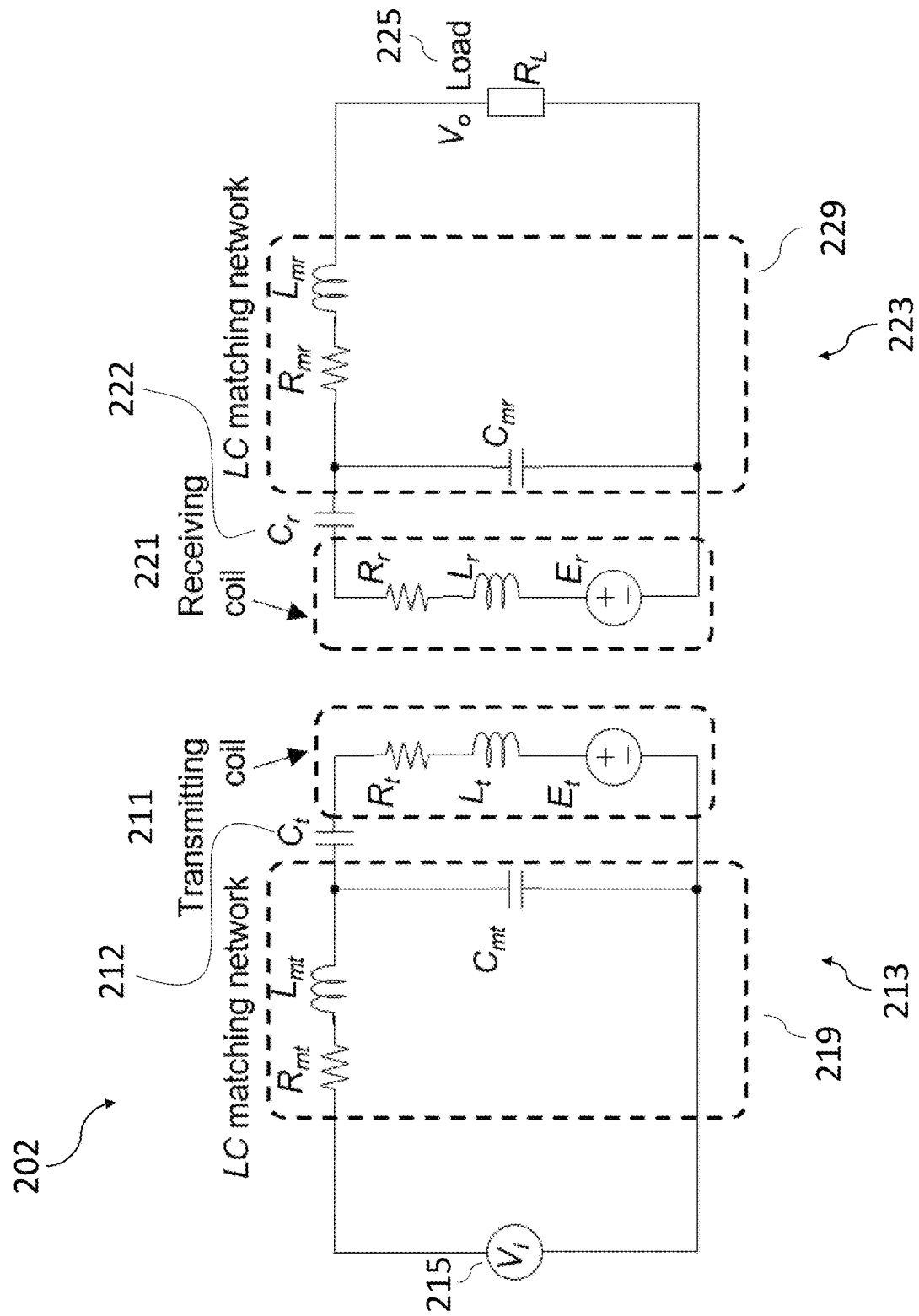
FIG. 2B shows a circuit model of a conventional WPT system with an LC matching network.

In yet another example, impedance matching circuits may be integrated into the transmitter 110 and/or the receiver 120 in order to increase both the energy transfer rate and the power efficiency. FIG. 2A shows a WPT system 200 a first π configuration impedance matching circuit 217 in the transmitter 210 and a second π configuration impedance matching circuit 227 in the transmitter 220. FIG. 2B shows a WPT system 202 a first LC configuration impedance matching circuit 219 in the transmitter 213 and a second LC configuration impedance matching circuit 229 in the transmitter 223.

Each matching circuit 217, 219 (227, 229) includes an inductor coil in series with an energy coupling coil 211 (221) and a resonant capacitor 212 (222). Each matching circuit 217, 219 (227, 229) may also include one or more capacitors, depending on the circuit configuration (e.g., the π configuration, LC configuration), in parallel with the energy coupling coil 211 (221) and the resonant capacitor 212 (222). A power source 215 is coupled in series in the transmitter 210, 213 and a load 225 is coupled in series in the receiver 220, 223. The inductors and capacitors in the impedance matching circuits 217 (219) and 227 (229) increase the voltage gain at the resonant frequency to compensate for the frequency splitting effect. Thus, the WPT systems 200 and 202 may operate at the resonant frequency to match the peak power efficiency without substantial reductions to the voltage gain and the energy transfer rate.

However, the impedance matching circuits 217, 219, 227, and 229 in these WPT systems 200 and 202 are typically discrete electrical components coupled to the energy coupling coils 211 and 221 and the resonant capacitors 212 and 222 with separate wiring. It is also common for the impedance matching circuits 217, 219, 227, and 229 to include large, heavy inductor coils. Thus, these impedance matching circuits 217, 219, 227, and 229 tend to increase the size, the complexity, and the weight of the WPT systems 200 and 202.

A WPT System with a Resonant Circuit Having Integrated Impedance Matching

Using an integrated impedance matching circuit in a WPT system increases both the energy transfer rate and the power efficiency without unduly increasing the WPT system's size or form factor. The circuit includes inductor coils and capacitors that increase the voltage gain, thus compensating the reductions in the energy transfer rate caused by the frequency splitting effect described above. The inductor coils used for impedance matching may also be positioned proximate to one another or integrated as a single inductor coil (e.g., a tapped inductor coil) in order to transmit and receive power in the transmitter and the receiver, respectively. By integrating the impedance matching functionality in the resonant circuit, the impedance matching circuits used in conventional WPT systems may be eliminated, substantially reducing the number of discrete electronic components used and, hence, the form factor and weight of the WPT system.

The WPT system described herein may have several benefits. For example, the WPT system may have a smaller operating area, thus reducing potential safety hazards associated with undesirable heating of objects that may be inadvertently disposed between the transmitter and the receiver. A smaller, lighter weight WPT system may also enable installation onto systems with stringent space and weight requirements, such as the side panels or bumpers of an EV, a charging platform for a drone or robot, or in confined spaces in vehicle trailers. In one exemplary application, one or more WPT systems may be installed on the undercarriage, side panels, and/or front/rear bumpers of an EV. These WPT systems may be used to charge the batteries of the EV when the EV is parked in a garage or parking lot or when the EV is stationary at a traffic light. Additionally, the WPT systems may also be used to transfer power between two vehicles on the road.

Figure 3A:
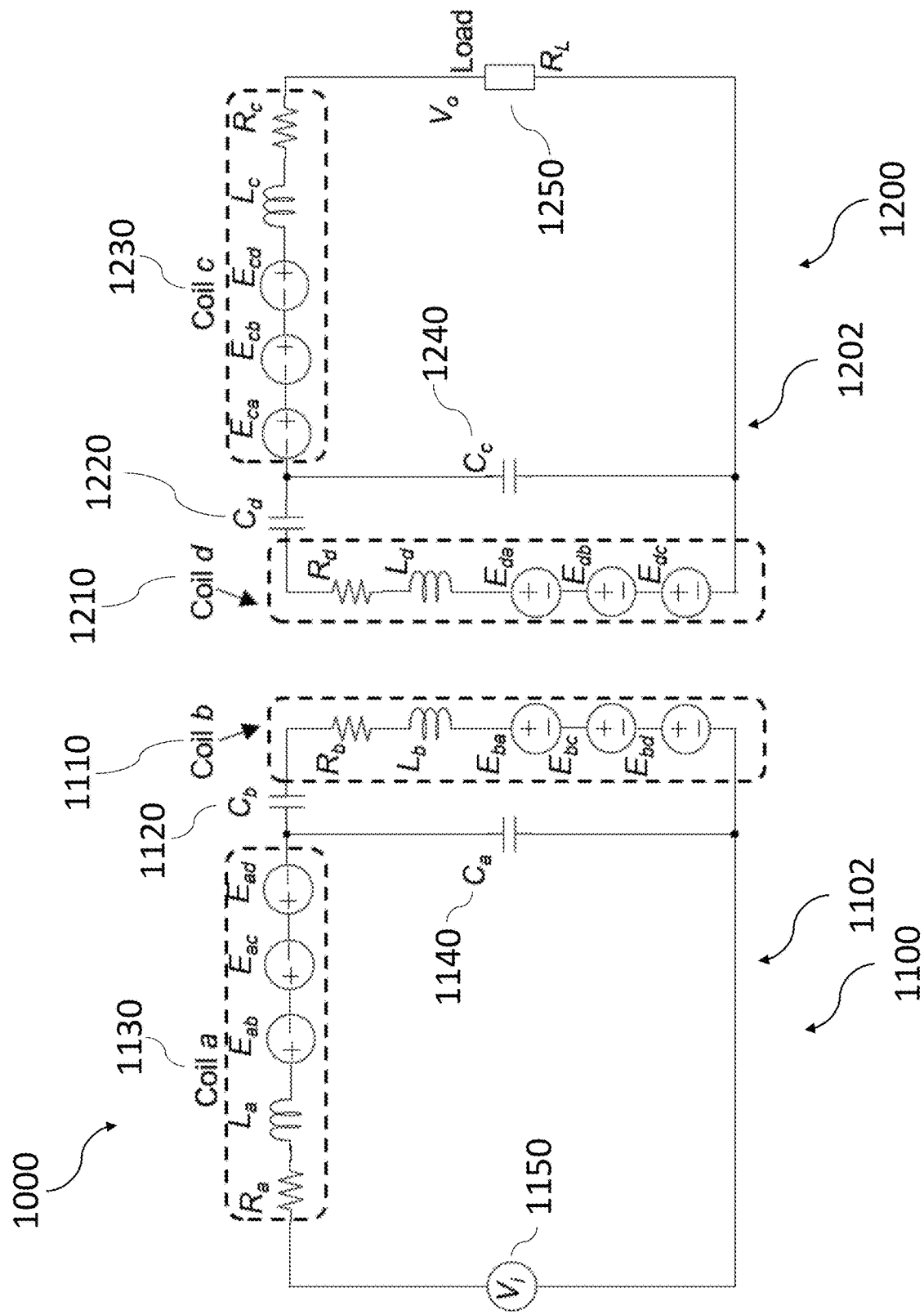
FIG. 3A shows a circuit model of an exemplary WPT system with two energy coupling and matching coils in the transmitter and two energy coupling and matching in the receiver.

FIG. 3A shows an exemplary design for a WPT system 1000. The WPT system 1000 may include a transmitter 1100 and a receiver 1200. The transmitter 1100 may include a resonant circuit 1102 with a first coil 1110, a first capacitor 1120 ($C_b$) coupled in series to the first coil 1110, a second coil 1130 coupled in series to the first coil 1110 and the first capacitor 1120, and a second capacitor 1140 ($C_a$) coupled in parallel to the first coil 1110 and the first capacitor 1120. The resonant circuit 1102 may be electrically coupled to a power source 1150 that supplies energy in the WPT system 1000. The first coil 1110 may be represented by a winding resistance ($R_b$) and a self-inductance ($L_b$). The second coil 1130 may be represented by a winding resistance ($R_a$) and a self-inductance ($L_a$). $R_a$ and $L_a$ may include the resistance and the inductance, respectively, of the wires connecting the power source 1150 to the second coil 1130.

Similarly, the receiver 1200 may include a resonant circuit 1202 with a third coil 1210, a third capacitor 1220 ($C_d$) coupled in series to the third coil 1210, a fourth coil 1230 coupled in series to the third coil 1210 and the third capacitor 1220, and a fourth capacitor 1240 ($C_c$) coupled in parallel to the third coil 1210 and the third capacitor 1220. The resonant circuit 1202 may be electrically coupled to a load 1250 that receives energy in the WPT system 1000. The third coil 1210 may be represented by a winding resistance ($R_d$) and a self-inductance ($L_d$). The fourth coil 1230 may be represented by a winding resistance ($R_c$) and a self-inductance ($L_c$). $R_c$ and $L_c$ may include the resistance and the inductance, respectively, of the wires connecting the load 1250 to the fourth coil 1230.

Codependency of Electronic Properties in the WPT System

During power transfer, the inductors in the WPT system 1000 may all be magnetically coupled to one another, giving rise to induced voltages at each inductor coil with contributions from the other inductor coils in the system. As shown in FIG. 3A, the voltage drop across the first coil 1110 also includes the induced voltages that arise at the first coil 1110 due to current flowing through the second coil 1130 ($E_{ba}$), the third coil 1210 ($E_{bd}$), and the fourth coil 1230 ($E_{bc}$). Similarly, the voltage drop across the second coil 1130 includes induced voltages from the first coil 1110 ($E_{ab}$), the third coil 1210 ($E_{ad}$), and the fourth coil 1230 ($E_{ac}$). The voltage drop across the third coil 1210 includes induced voltages from the first coil 1110 ($E_{db}$), the second coil 1130 ($E_{da}$), and the fourth coil 1230 ($E_{dc}$). Finally, the voltage drop across the fourth coil 1230 includes induced voltages from the first coil 1110 ($E_{cb}$), the second coil 1130 ($E_{ca}$), and the third coil 1210 ($E_{cd}$).

Because the inductor coils in the WPT system 1000 are magnetically coupled to one another, the electronic and structural properties of the inductor coils and the capacitors are codependent and should be tuned collectively to increase both the energy transfer rate and the power efficiency of the WPT system 1000. This is in stark contrast to conventional WPT systems with impedance matching circuits where the electronic properties of the matching circuit in a transmitter or a receiver are typically tuned independently of the other electronic components in the transmitter and the receiver.

For example, the first coil 1110 and the second coil 1130 in the transmitter 1100 should be tuned such that the phase difference between the electric currents flowing through the first coil 1110 and the second coil 1130 is small. A smaller phase difference corresponds to less destructive interference between the magnetic fields generated by the first coil 1110 and the second coil 1130 and thus greater power transfer. For the WPT system 1000, the phase difference between the electric currents flowing through the first coil 1110 and the second coil 1130 (or the third coil 1210 and the fourth coil 1230 in the receiver 1200) should preferably be less than about 20 degrees (e.g., 15 degrees, 10 degrees, 5 degrees, and so on).

In another example, the WPT system 1000 may be designed to operate at a particular distance between the inductor coils in the transmitter 1100 and the receiver 1200. The first coil 1110/second coil 1130 and the third coil 1210/fourth coil 1230 may be collectively tuned to increase the energy transfer rate and efficiency. Once the inductor coils are tuned for a particular gap, subsequent changes to the gap (e.g., a larger or smaller gap) may reduce the energy transfer rate.

Operating Parameters and Electronic Properties in the WPT System

The energy transfer rate and the power efficiency of the WPT system 1000 may generally depend on the electronic properties of the components in the resonant circuits 1102 and 1202 as well as the desired operating conditions, such as the separation gap and size constraints on the WPT system 1000. The energy transfer rate of the WPT system 1000 may be tailored for low power and/or high power applications. In principle, the WPT system 1000 may be tailored to operate at any power level. For example, the energy transfer rate may vary between about 1 W to about 500 kW. Generally, the power efficiency of the WPT system 1000 may vary between about 1% to about 100%. A higher power efficiency in the WPT system 1000 is generally preferable for several reasons including, but not limited to, reducing the charging time of the load 1250 (e.g., a battery), supplying more power to the load 1250 (e.g., a motor), and reducing the amount of power generated by the power source 1150. However, the desired power efficiency may also vary with the application. For example, a power efficiency of at least 85% (e.g., 90%, 95%, or more) is preferable for charging electric vehicles.

The distance between the inductor coils of the transmitter 1100 and the receiver 1200 may generally vary between about 0.1 cm to about 1 m. For some applications, the separation gap range maybe substantially smaller. For example, WPT systems 1000 used in electric vehicles may have a separation gap ranging between about 10 mm to about 200 mm. The smaller separation gap provides several benefits including: (1) a larger magnetic coupling coefficient k and thus a higher power efficiency, (2) less EMI in the environment due to fringe magnetic fields at the edges of the inductor coils, and (3) better safety by preventing objects, small children, or animals from getting between the transmitter 1100 and the receiver 1200.

The operating frequency of the WPT system 1000 may also vary between about 20 kHz and about 20 MHz. However, in some applications, the operating frequencies may be constrained to a particular band based on industry standard guidelines. For instance, in EVs, the operating frequency may range between about 80 kHz and about 90 kHz (e.g., 87.5 kHz) as set forth by the Society of Automotive Engineers (SAE) guidelines for wireless power transfer in light-duty plug-in/EVs.

As described above, the electronic properties of the WPT system 1000 are codependent and may vary based on one or more operating parameters, such as the desired energy transfer rate, power efficiency, separation gap, and operating frequency. For the transmitter 1100, the first coil 1110 may have an inductance ranging between about 0.1 µH to about 100 µH. The second coil 1130 may have an inductance ranging between about 0.1 µH to about 100 µH. The first capacitor 1120 may have a capacitance ranging between about 0.01 µF to about 100 µF. The second capacitor 1140 may have a capacitance ranging between about 0.01 µF to about 100 µF.

The receiver 1200 may also exhibit similar parameter ranges. The third coil 1210 may have an inductance ranging between about 0.1 µH to about 100 µH. The fourth coil 1230 may have an inductance ranging between about 0.1 µH to about 100 µH. The third capacitor 1220 may have a capacitance ranging between about 0.01 µF to about 100 µF. The fourth capacitor 1240 may have a capacitance ranging between about 0.01 µF to about 100 µF.

In some applications, the inductance of the first coil 1110, the second coil 1130, the third coil 1210, and the fourth coil 1230 may each be tailored to be substantially larger than any stray inductance in the WPT system 1000. For example, the wiring used to couple the second coil 1130 to the power source 1150 or the fourth coil 1230 to the load 1250 may have stray inductance that may affect the resonant frequency of the WPT system 1000. If the inductance of the second coil 1130 and/or the fourth coil 1230 is substantially larger than the stray inductance (e.g., the inductance of the coil is 10 times larger than the stray inductance), the effects on the resonant frequency may be negligible. However, an excessively large inductance may also not be desirable as large inductances may result in an undesirable voltage gain, as described below.

The first coil 1110, the second coil 1130, the third coil 1210, and the fourth coil 1230 may each be various types of inductors including, but not limited to, an air cored inductor, an iron cored inductor, a ferrite cored inductor, a bobbin based inductor, a toroidal inductor, a flat spiral inductor, a multilayer ceramic inductor, and any other inductors known to one of ordinary skill in the art. For some WPT systems 1000, the first coil 1110, the second coil 1130, the third coil 1210, and the fourth coil 1230 may have a shape, dimensions, and/or an inductance that are substantially similar to one or more other inductor coils in the WPT system 1000. For some WPT systems 1000, the first coil 1110, the second coil 1130, the third coil 1210, and the fourth coil 1230 may each be substantially different in terms of the shape, dimensions, and/or the inductance.

The shape and dimensions of the first coil 1110, the second coil 1130, the third coil 1210, and the fourth coil 1230 may vary so as to conform to the shape of the underlying support structure. For example, an inductor coil installed on the undercarriage of an EV may be substantially flat. In another example, an inductor coil installed in the bumper of an EV may be curved to conform to the bumper or vehicle frame.

For some WPT systems 1000, the operating area of the transmitter 1100 and/or the receiver 1200 is determined by the shape and dimensions of the coils. Generally, the first coil 1110, the second coil 1130, the third coil 1210, and the fourth coil 1230 may have a characteristic dimension (e.g., a diameter) that varies between about 100 mm to about 15 m. For some applications, the operating area and, hence, the size of the inductor coils may be constrained. For example, the size of the inductor coils may be constrained by the size of the undercarriage in a vehicle.

The first coil 1110, the second coil 1130, the third coil 1210, and the fourth coil 1230 may be formed from various electrical conductors including, but not limited to, copper, aluminum, any alloys of the foregoing, or any other electrical conductors known to one of ordinary skill in the art. Various types of wiring may also be used to form the inductor coils including, but not limited to, Litz wiring, multistrand wiring, tinsel wiring, or any other wiring known to one of ordinary skill in the art.

The first capacitor 1120, the second capacitor 1140, the third capacitor 1220, and the fourth capacitor 1240 may each be various types of capacitors including, but not limited to, a ceramic capacitor, a film capacitor, an electrolytic capacitor, a supercapacitor, or any other capacitor known to one of ordinary skill in the art. For some WPT systems 1000, the first capacitor 1120, the second capacitor 1140, the third capacitor 1220, and the fourth capacitor 1240 may be formed from two or more capacitors coupled in series and/or parallel in order to (1) tune the resonance frequency and/or (2) to support a higher energy transfer rate if the voltage/current rating for a single capacitor is not sufficient.

For some WPT systems 1000, the first capacitor 1120, the second capacitor 1140, the third capacitor 1220, and the fourth capacitor 1240 may have a shape, dimensions, and/or an inductance that are substantially similar to one or more other capacitors in the WPT system 1000. For some WPT systems 1000, the first capacitor 1120, the second capacitor 1140, the third capacitor 1220, and the fourth capacitor 1240 may each be substantially different in terms of the shape, dimensions, and/or the capacitance.

Tunability of the WPT System

The resonant circuits 1102 and 1202 of the WPT system 1000 may generally be tuned to adjust various operating parameters in the WPT system 1000 including, but not limited to, the resonant frequency, the voltage gain, the energy transfer rate, and the power efficiency. Tuning may be accomplished, in part, by adjusting the inductances of the first coil 1110 and/or the second coil 1130 and/or the capacitances of the first capacitor 1120 and/or the second capacitor 1140. For some WPT systems 1000, some of these electronic parameters may be fixed during assembly and thus cannot be changed once the WPT system 1000 is fully assembled, such as the inductances of the coils, which may be determined by the thickness and/or the number of turns of the coil. However, in some WPT systems 1000, these electronic parameters may be tunable after assembly of the WPT system 1000, such as the capacitances of the capacitors.

For example, the WPT system 1000 may be configured to operate over a broad range of operating frequencies, which may change during operation depending on the application. The first capacitor 1120 and the second capacitor 1140 may be variable capacitors, which are capacitors with capacitances that may be changed in a mechanical or electronic manner. The LC resonant frequency may thus be tuned by adjusting the capacitances of each respective capacitor in the WPT system 1000 to match the operating frequency in order to maintain a high power efficiency. For instance, the WPT system 1000 may include only the receiver 1200. The receiver 1200 may receive power from other transmitters (e.g., the conventional transmitters described above), which may operate at different frequencies. In order to maintain a high power efficiency and a high energy transfer rate, the resonant frequency of the receiver 1200 may be tuned to match the operating frequency of the transmitter. While the energy transfer rate and the power efficiency may be lower compared to the case where the receiver 1200 is coupled to the transmitter 1100, the receiver 1200 nevertheless may still be able to receive and transfer power to the load 1250.

In another example, the voltage gain between the power source 1150 and the load 1250 in the WPT system 1000 may be adjusted depending on the application. For example, the WPT system 1000 may provide a voltage gain ranging between about 0.01 to about 100. As described above, the impedance matching functionality in the resonant circuits 1102 and 1202 is used to increase the voltage gain in the WPT system 1000 in order to compensate the frequency splitting effect. However, in some applications, it may not be desirable for the WPT system 1000 to operate at the highest voltage gain possible. For example, in applications involving wireless power transfer between vehicles, the WPT system 1000 should preferably be a symmetric system where a vehicle receives or transmits the same voltage and current levels with respect to another vehicle. In other words, the voltage gain should preferably be about 1.0. In another example, a vehicle may be charged using power sourced from a wall socket. The socket voltage may be substantially higher than the car battery voltage, thus the preferred voltage gain may be less than 1.0.

Additional Considerations

The WPT system 1000 may also be configured to operate with various media disposed between the transmitter 1100 and the receiver 1200 including, but not limited to, air, water, salt water, snow, and ice. For some WPT systems 1000, the electronic properties of the resonant circuits 1102 and 1202 may be tailored to accommodate different media with different complex dielectric permittivities to avoid undesirable reductions in the energy transfer rate and the power efficiency. Some WPT systems 1000 may instead be configured to be insensitive to changes in the medium between the transmitter 1100 and the receiver 1200 changes when the WPT system 1000 is in use. For example, the separation gap between the inductor coils of the transmitter 1100 and the receiver 1200 may be kept sufficiently small such that any drop in the magnetic field in the medium is negligible even if the medium changes during operation (e.g., snow or ice accumulate between the transmitter 1100 and the receiver 1200). The complex dielectric permittivity of media is generally frequency dependent. Thus, the operating frequency and the resonant frequency may also be tuned to operate at frequencies where losses in the medium are lower and preferably negligible. For example, ice exhibits a peak in absorption loss at a frequency of about 5-6 kHz, which decreases monotonically at lower frequencies and higher frequencies outside the 5-6 kHz range. Thus, the operating frequency and the resonant frequency may be tuned to frequencies with lower loss (e.g., outside the 5-6 kHz range for ice), which may also vary depending on the gap between the transmitter 1100 and the receiver 1200, the acceptable losses in the WPT system 1000, and constraints imposed on the operating frequency range or resonant frequency range.

The WPT system 1000 is generally not limited to the circuit components previously described in the resonant circuits 1102 and 1202 shown in FIG. 3A. The resonant circuits 1102 and/or 1202 may generally include additional inductors and/or capacitors to further increase the energy transfer rate and/or the power efficiency of the WPT system 1000. For some WPT systems 1000, each additional inductor may be accompanied by a corresponding capacitor. These additional electronic components may be used to further increase the voltage gain and/or to transmit/receive more power compared to the design shown in FIG. 3A.

As described above, the transmitter 1100 and/or the receiver 1200 may be used with other receivers and transmitters, respectively. For example, some WPT systems 1000 may include only the transmitter 1100 to be used with various conventional receivers. Similarly, some WPT systems 1000 may include only the receiver 1200 to be used with various conventional transmitters. The added compatibility of the transmitter 1100 or receiver 1200 with other systems may allow for more widespread use of the WPT system 1000 by utilizing transmitters and receivers already deployed in the field. The increase in the energy transfer rate and the power efficiency may not be as large compared to WPT systems 1000 that include both the transmitter 1100 and the receiver 1200, but the transmitter 1100 or the receiver 1200 may nevertheless supply or receive power wirelessly from other systems. As described above, the transmitter 1100 and the receiver 1200 may be tuned to accommodate conventional receivers and transmitters, respectively. For example, the resonant frequency may be tuned to match the operating frequency of the conventional receivers and transmitters.

The transmitter 1100 and the receiver 1200 may be distinguished only by their connection to the power source 1150 and the load 1250. The resonant circuits 1102 and 1202 are agnostic to their function as a transmitter or a receiver, which allows the WPT system 1000 to transmit and receive power in a bidirectional manner. For example, the resonant circuit 1102 may be electrically coupled to a switch that toggles between the power source 1150 and a load. Similarly, the resonant circuit 1202 may be electrically coupled to a switch that toggles between the load 1250 and a power source. In another example, the power source 1150 and the load 1250 may both be a battery and/or a supercapacitor configured to supply power and/or receive power depending on the operating mode. In one operating mode, the resonant circuit 1102 may be coupled to the power source 1150 and the resonant circuit 1202 coupled to the load 1250 such that power is transferred from the resonant circuit 1102 to the resonant circuit 1202. In another operating mode, the resonant circuit 1102 may be coupled to a load and the resonant circuit 1202 coupled to a power source such that power is transferred from the resonant circuit 1202 to the resonant circuit 1102. In this manner, the designation of which resonant circuit corresponds to the transmitter and the receiver is wholly dependent on the operating mode of the WPT system 1000. The resonant circuit 1102 or 1202 in the WPT system 1000 may thus be used as either a transmitter and a receiver, reducing costs and saving space/weight.

Exemplary Designs for the WPT System

Figure 3B:
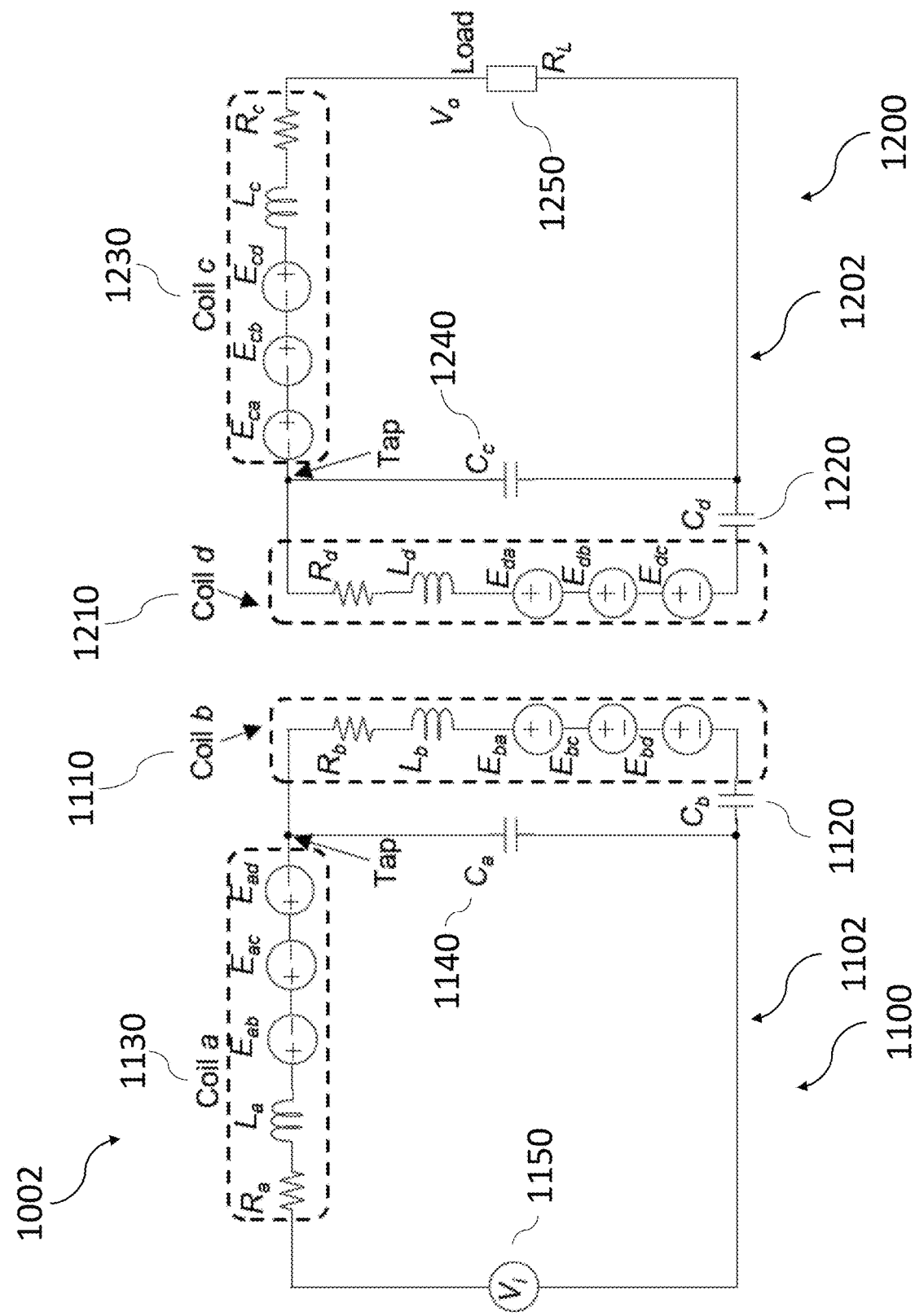
FIG. 3B shows a circuit model of another exemplary WPT system where the location of the resonant capacitor and the first coil in the resonant circuit is switched. This circuit model may also use a tapped inductor coil.
Figure 3C:
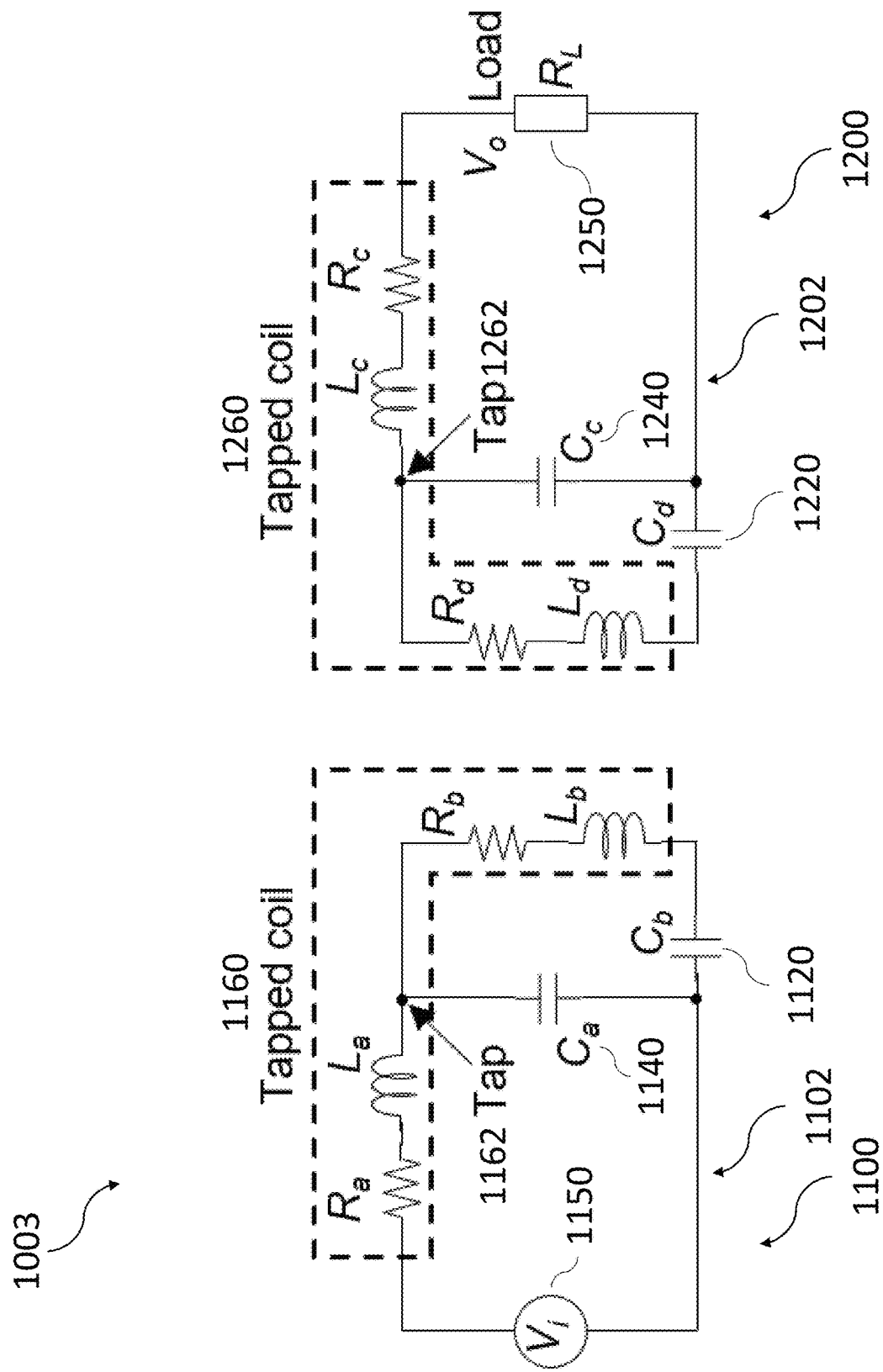
FIG. 3C shows a circuit model of another exemplary WPT system using a tapped inductor coil based on the circuit model of FIG. 3B.

FIGS. 3B and 3C show different WPT designs. FIG. 3B shows a WPT system 1002 with an alternative circuit arrangement with respect to FIG. 3A where the first capacitor 1120 is coupled in series between the power source 1150 and the first coil 1110. In other words, the location of the first capacitor 1120 and the first coil 1110 are switched in the resonant circuit 1102. The third capacitor 1220 is also coupled in series between the load 1250 and the third coil 1210. The WPT system 1002 shown in FIG. 3B may function substantially similar to the WPT system 1000 shown in FIG. 3A. The WPT system 1002 shown in FIG. 3B may also use a tapped inductor coil instead of the first coil 1110 and the second coil 1130.

FIG. 3C shows a WPT system 1003 where the first coil 1110 and the second coil 1130 in the transmitter 1100 are replaced by a tapped inductor coil 1160. The tap in the inductor coil 1160 may be coupled to the second capacitor 1140 as shown in FIG. 3C. Similarly, the third coil 1210 and the fourth coil 1230 in the receiver 1200 may also be replaced by a tapped inductor coil 1260 with a tap coupled to the fourth capacitor 1240. Using a tapped inductor coil further simplifies the WPT system 1003 by eliminating the use of separate inductor coils in the resonant circuit 1102 and 1202.

An Exemplary Coil Assembly for a Transmitter and/or a Receiver

Figure 4A:
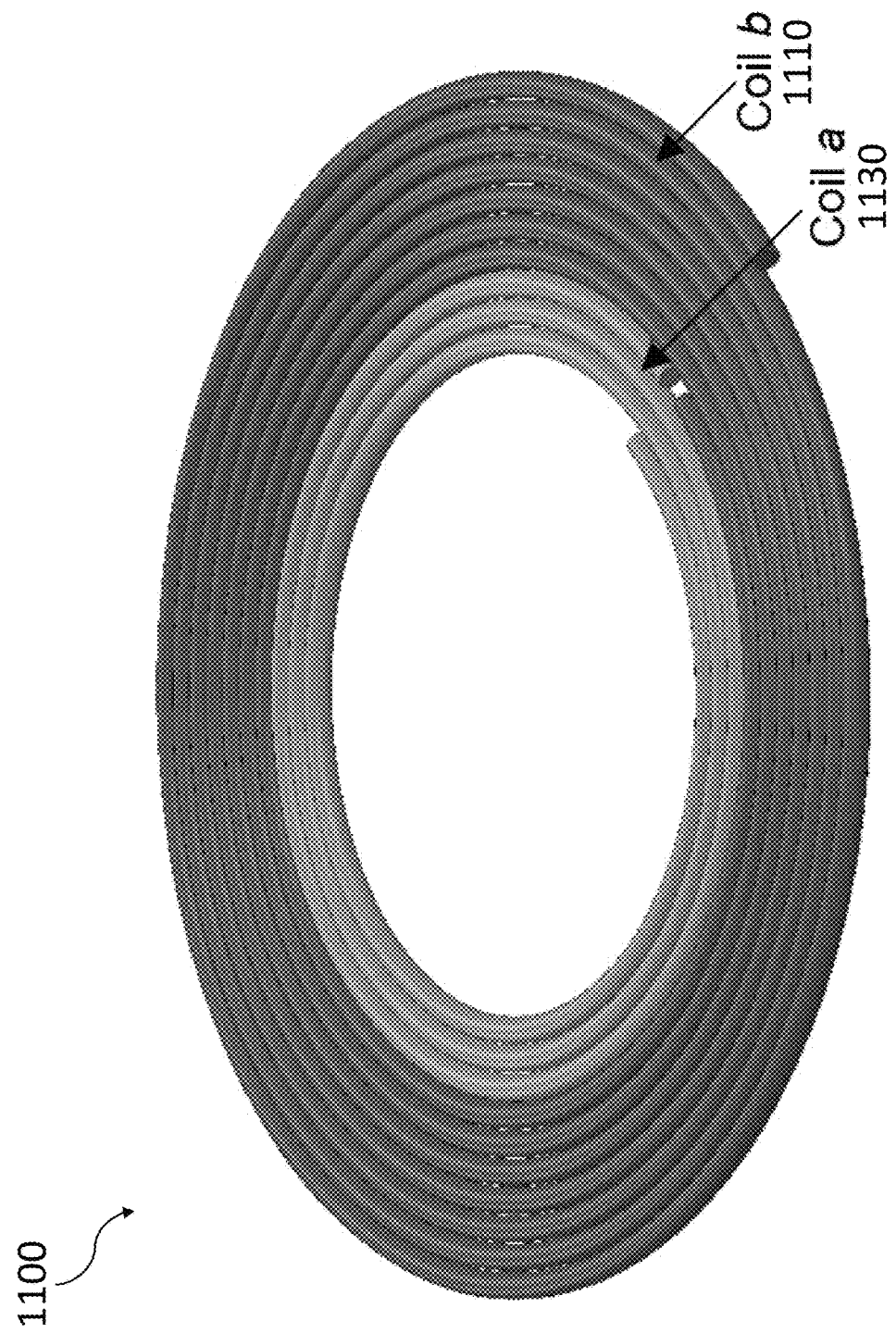
FIG. 4A shows an exemplary first coil and second coil as flat spiral coils where the second coil is disposed in the center of and concentric with the first coil.
Figure 4B:
FIG. 4B shows an exemplary first coil and second coil as flat spiral coils where the first coil is disposed in the center of and concentric with the second coil.
Figure 4C:
FIG. 4C shows an exemplary first coil and second coil as flat spiral coils where the second coil is disposed on and concentric with the first coil.

FIGS. 4A-4C show exemplary assemblies and designs of the first coil 1110 and the second coil 1130 in the transmitter 1100. These assemblies and designs may also be applied to the third coil 1210 and the fourth coil 1230 in the receiver 1200. As shown, the first coil 1110 and the second coil 1130 may each be a flat spiral coil, which is a type of air core coil. The flat spiral coil may be comprised of one or more wires curved to form a spiral shape with one or more turns and a center opening. The spiral may be substantially flat. For some WPT systems 1000, the use of flat spiral coils may allow the gap to be substantially uniform between the transmitter 1100 and the receiver 1200 (e.g., the transmitter 1100 and the receiver 1200 are in parallel alignment). Constraining the gap in this manner may simplify tuning of other structural and electronic properties of the resonant circuit 1102 compared to the case where the gap varies spatially across the area of the transmitter 1100 and the receiver 1200.

As shown in FIGS. 4A-4C, the first coil 1110 and the second coil 1130 may be disposed in close proximity to one another (e.g., less than 1 mm) in order to allow both inductor coils to transmit power to a receiver at a substantially similar separation gap. For example, FIG. 4A shows an exemplary assembly where the second coil 1130 is disposed in the center opening of the first coil 1110. FIG. 4B shows another exemplary assembly where the first coil 1110 is disposed in the center opening of the second coil 1130. FIG. 4C shows yet another exemplary assembly where the second coil 1130 is stacked onto the first coil 1110 in a concentric manner. For some WPT systems 1000, the first coil 1110 and the second coil 1130 may be arranged such that the first coil 1110 and a corresponding third coil 1210 are closer than the second coil 1130 and the fourth coil 1230. For some WPT systems 1000, the first coil 1110 and the third coil 1210 may be spaced farther apart compared to the second coil 1130 and the fourth coil 1230. In this assembly, the thickness of the first coil 1110 or the third coil 1130 may also affect the separation gap depending on the arrangement between transmitter 1100 and the receiver 1200.

The respective ends of the first coil 1110 and the second coil 1130 may be electrically coupled in accordance to the circuit schematic shown in FIG. 3A. For instance, in FIG. 3A, the innermost end of the second coil 1130 and the outermost end of the first coil 1110 may be coupled to the power source 1150. The outermost end of the second coil 1103 and the innermost end of the first coil 1110 may be coupled to both the first capacitor 1120 and the second capacitor 1140.

The inductance of a flat spiral coil may depend on several tunable structural parameters including, but not limited to, the number of turns, the inner diameter of the center opening, the outer diameter, the distance between adjacent windings in the spiral, the diameter/thickness of the wire, and the cross-sectional shape of the wiring. Additionally, the wiring used to form the flat spiral coil may include one or more strands (e.g., a multistrand wire, a Litz wire). Various electrically conducting materials may also be used to form the flat spiral coil including, but not limited to, copper, aluminum, any alloys of the foregoing, or any other electrically conducting materials known to one of ordinary skill in the art. Although FIGS. 4A-4C show the first coil 1110 and the second coil 1130 as being substantially circular, other shapes may be used including, but not limited, an ellipse, a square, a rectangle, a triangle, or any other polygonal shape known to one of ordinary skill in the art.

These parameters may be adjusted in order to support low power or high power applications at various operating ranges. For example, to support a larger energy transfer rate, the diameter of the flat spiral coil may increase and the wiring may be made thicker. These parameters may also enable operation over larger separation gaps between the transmitter 1100 and the receiver 1200. However, a larger outer diameter coil also results in a larger and heavier WPT system 1000, which may not be desirable for certain applications where space and weight savings are important.

An Exemplary WPT System Using Flat Spiral Coils

Figure 5:
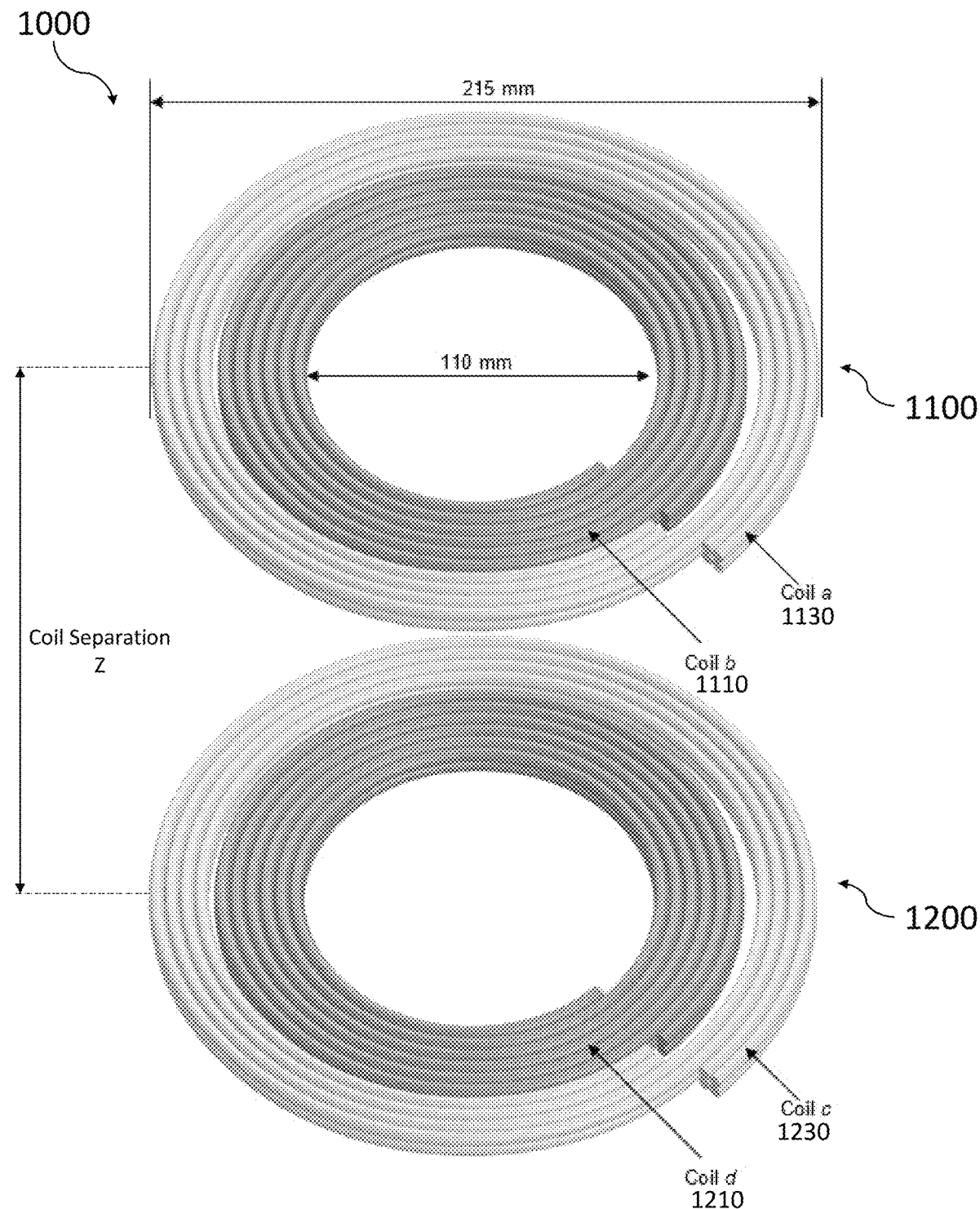
FIG. 5 shows an exemplary WPT system with a transmitter and a receiver comprised of flat spiral coils.

FIG. 5 shows an illustration of a prototype WPT system 1000 where the first coil 1110, the second coil 1130, the third coil 1210, and the fourth coil 1230 are all flat spiral coils. In this exemplary prototype, the first coil 1110 is disposed in the center opening of the second coil 1130. Similarly, the third coil 1210 is disposed in the center opening of the fourth coil 1230. As shown, the outer diameter of the second coil 1130 and the fourth coil 1230 is 215 mm. The inner diameter of the first coil 1110 and the third coil 1210 is 110 mm. Each flat spiral coil is formed from a Litz wire in order to reduce undesirable conduction losses caused by the skin effect. The wiring used in the first coil 1110 and the third coil 1210 include two wires coupled electrically in parallel to one another. The wiring used in the second coil 1130 and the fourth coil 1230 include four wires coupled electrically in parallel. The diameter of each individual fiber in the Litz wire is about 0.1 mm. In other designs, the flat spiral coils may be formed onto a printed circuit board or other types of wiring known to one of ordinary skill in the art. The first coil 1110 and the second coil 1130 are separated from the third coil 1210 and the fourth coil 1230 by a separation gap, Z.

As shown, the first coil 1110 and the second coil 1130 are identical to the third coil 1210 and the fourth coil 1230. Thus, in principle, either the first coil 1110 and the second coil 1130 or the third coil 1210 and the fourth coil 1230 may be used as the transmitter and the receiver. The first coil 1110 and the second coil 1130 are coupled to the first capacitor 1120 (not shown), the second capacitor 1140 (not shown), and the power source 1150 (not shown) based on the circuit models shown in FIG. 3A or 3B. Similarly, the third coil 1210 and the fourth coil 1230 are coupled to the third capacitor 1220 (not shown), the fourth capacitor 1240 (not shown), and the load 1250 (not shown) as shown in FIG. 3A.

For this exemplary design, the inductances and capacitances were tuned for a separation gap of 50 mm and a resonant frequency of 87 kHz. The inductances of the first coil 1110 and the second coil 1130 are 10 µH and 2 µH, respectively. The capacitances of the first capacitor 1120 and the second capacitor 1140 are 0.067 µF and 1 µF, respectively. Similarly, the inductances of the third coil 1210 and the fourth coil 1230 are 10 µH and 2 µH, respectively. The capacitances of the third capacitor 1220 and the fourth capacitor 1240 are 0.067 µF and 1 µF, respectively. The inductances are fixed in this design, but the capacitances may be varied, thus allowing tunability of the resonant frequency.

Figure 6A:
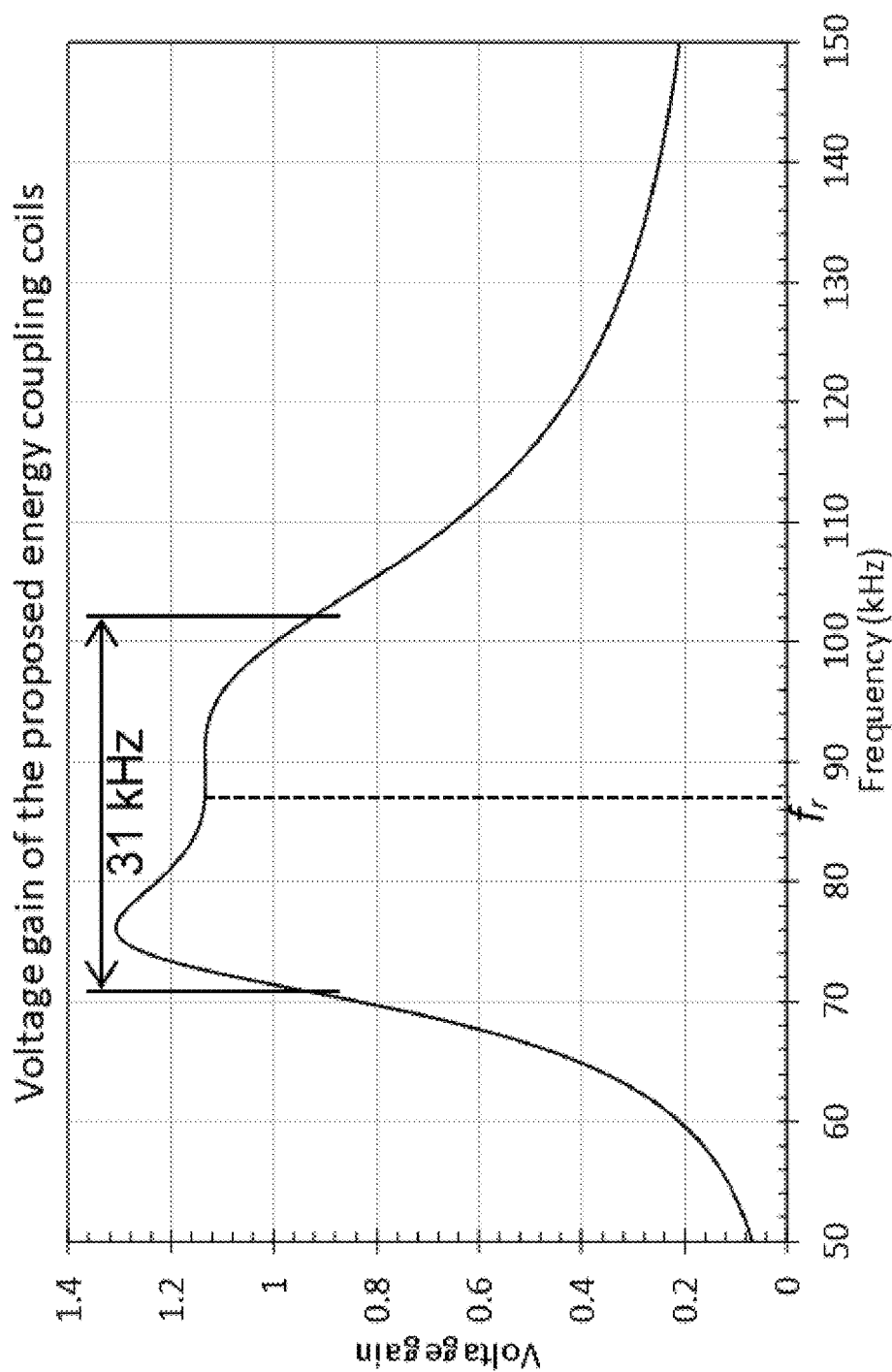
FIG. 6A shows a chart of the voltage gain versus frequency of the exemplary WPT system shown in FIG. 5.
Figure 6B:
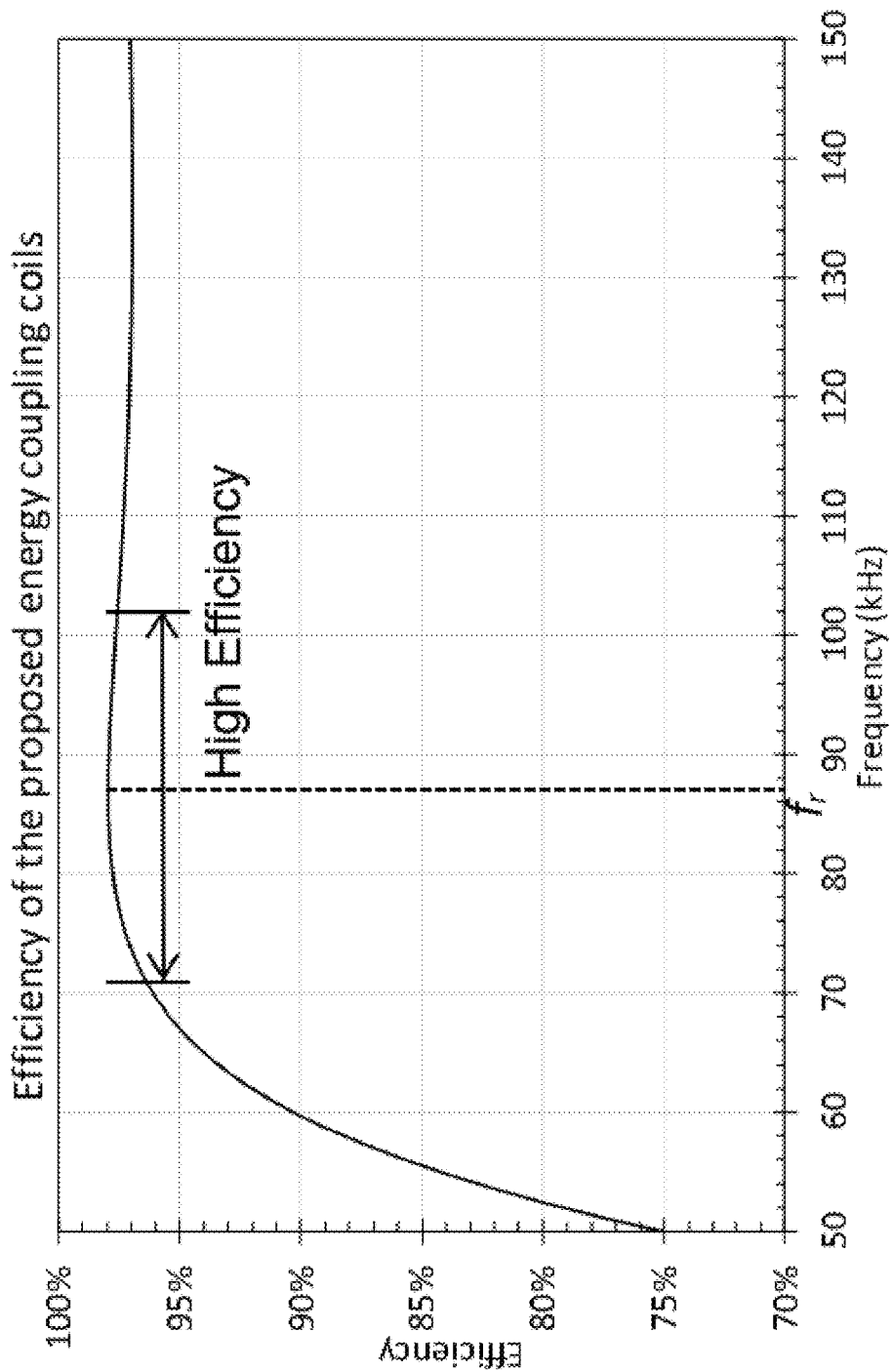
FIG. 6B shows a chart of the power efficiency versus frequency of the exemplary WPT system shown in FIG. 5.

FIGS. 6A and 6B show the voltage gain and the power efficiency, respectively, as a function of the operating frequency for the WPT system 1000 described above. As shown in FIG. 6A, the voltage gain is larger than 1 at the resonant frequency of 87 kHz. The 3 dB bandwidth of the voltage gain is about 31 kHz. This is substantially larger than the conventional WPT system 100 with a magnetic coupling coefficient k=0.05, which has a 3 dB bandwidth of about 5 kHz as shown in FIG. 1B. Additionally, FIG. 6B shows the power efficiency is greater than 95% at the resonant frequency and across the 31 kHz 3 dB bandwidth.

Additional experiments were performed on the prototype WPT system 1000 to evaluate the sensitivity of the power efficiency as a function of the alignment and the separation gap between the transmitter 1100 and the receiver 1200. In these experiments, the first coil 1110 and the second coil 1130 in the transmitter 1100 were excited by a full-bridge power inverter operating at 87 kHz. The AC voltage induced at the third coil 1210 and the fourth coil 1230 were rectified by a synchronous rectifier. The magnetic fields generated by the first coil 1110 and the second coil 1130 in the transmitter 1100 and the third coil 1210 and the fourth coil 1230 in the receiver 1200 were shielded by ferrite and metal plates.

Figure 7A:
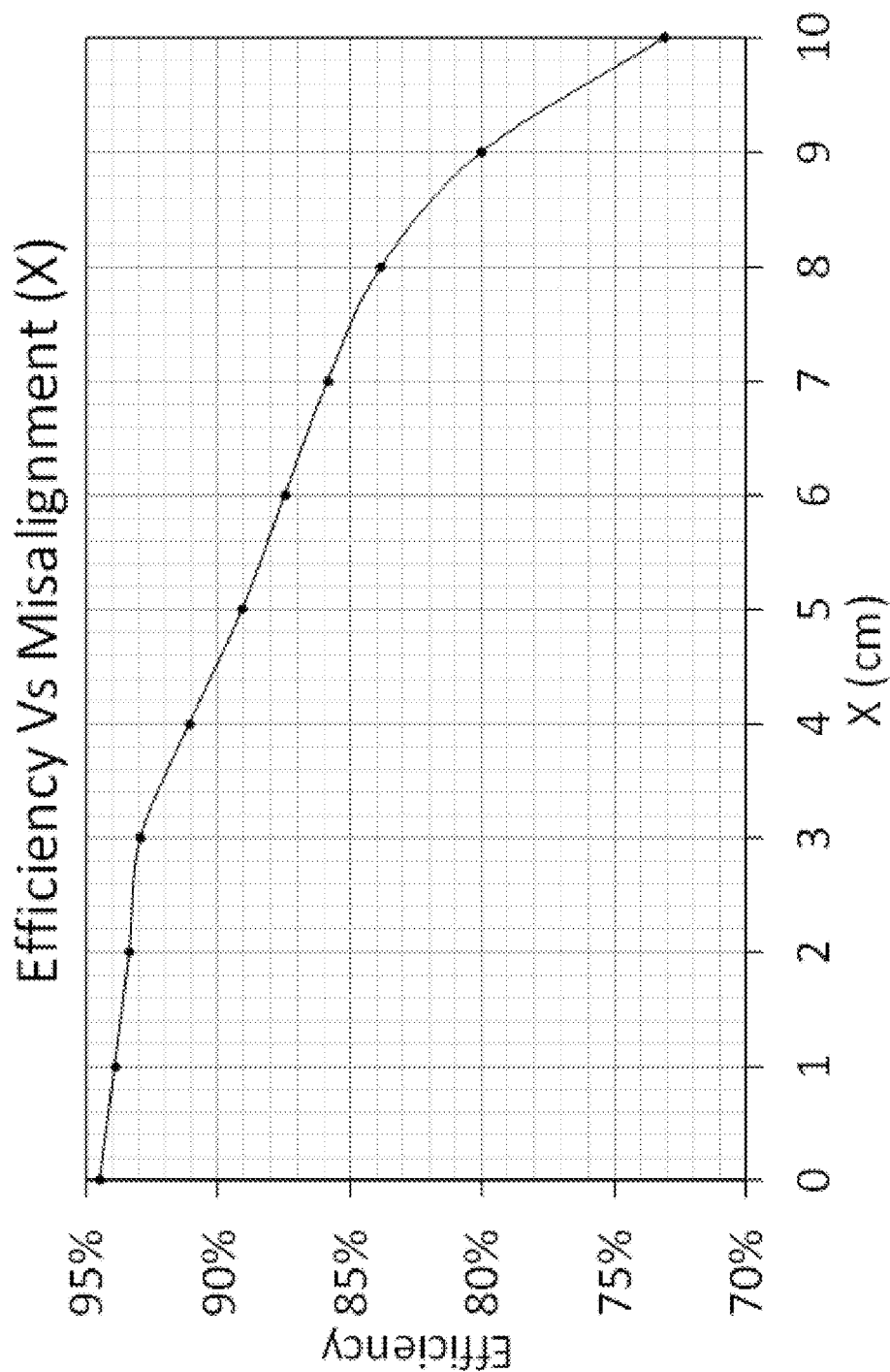
FIG. 7A shows a chart of the power efficiency as a function coil misalignment along the radial axis, X, for the exemplary WPT system shown in FIG. 5.
Figure 7B:
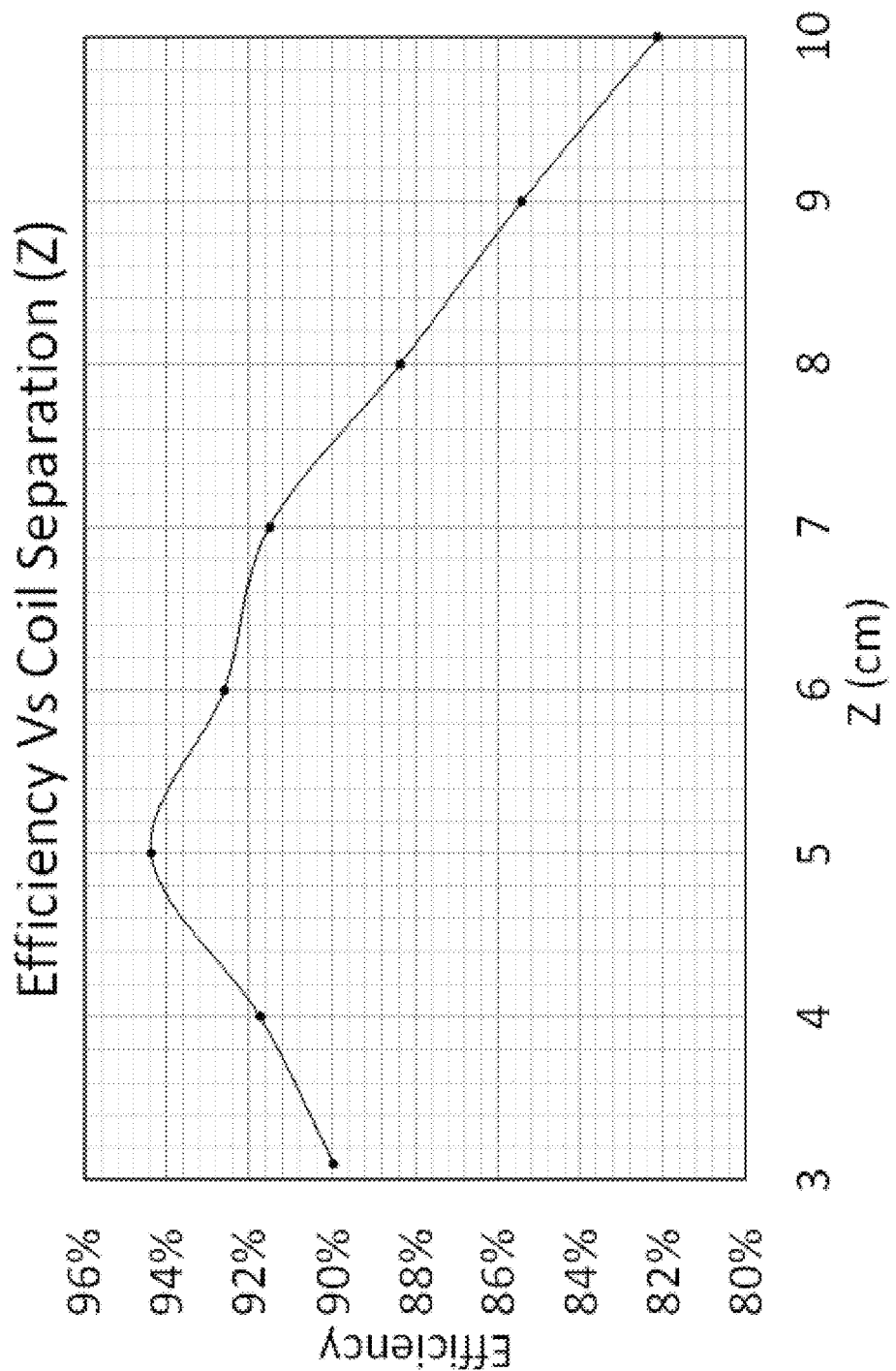
FIG. 7B shows a chart of the power efficiency as a function of coil separation along the axial axis, Z, for exemplary WPT system shown in FIG. 5.

FIGS. 7A and 7B show the power efficiency as a function of a coil misalignment, X, and the separation gap, Z, respectively. The coil misalignment is the lateral distance between the centers of the transmitter 1100 and the receiver 1200 (the lateral deviation from concentric alignment). As shown in FIG. 7A, the power efficiency remains greater than 91% for a coil misalignment, X, less than about 40 mm. As shown in FIG. 7B, the power efficiency exhibits a peak centered about the preferred separation gap of 50 mm. As described above, the inductances and capacitances of the WPT system 1000 may be tailored for a specific separation gap. When the separation gap deviates from the preferred separation gap, suboptimal inductive coupling may occur thus reducing the power efficiency. Nevertheless, the power efficiency in FIG. 7B remains greater than 91% for a separation gap, Z, between 40 mm and 70 mm. Therefore, this data shows that the prototype WPT system 1000 can achieve a high power efficiency even when the inductor coils in the transmitter 1100 and the receiver 1200 are misaligned and when the separation gap deviates from the preferred separation gap. Furthermore, the prototype WPT system 1000 does include tuning capacitors and switches rated for high power applications, which substantially reduce the size, weight, and cost of the WPT system 1000.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A wireless power receiver, comprising:
a resonant circuit to receive power from a wireless power transmitter via wireless magnetic resonance charging at a voltage gain of about 1 and an efficiency of at least 95% at a resonant frequency between about 80 kHz and about 90 kHz, the resonant circuit comprising:
a first coil;
a second coil coupled in series and concentric with the first coil and stacked on the first coil, the first coil and the second coil receiving the power from a third coil and a fourth coil in the wireless power transmitter at the resonant frequency during operation of the wireless power receiver;
a first capacitor coupled in series with the first coil; and
a second capacitor coupled in parallel with the first coil and the first capacitor,
wherein:
the first coil is magnetically coupled to the second coil;
the first coil and the second coil are operable to, when physically aligned with the wireless power transmitter, be magnetically coupled to the third coil and the fourth coil; and the first capacitor and the second capacitor do not act as an open circuit during operation of the wireless power receiver.

2. The wireless power receiver of claim 1, wherein:
the first coil has an inductance of about 0.1 µH to about 100 µH,
the first capacitor has a capacitance of about 0.01 µf to about 100 µf,
the second coil has an inductance of about 0.1 µH to about 100 µH, and
the second capacitor has a capacitance of about 0.01 µf to about 100 µf.

3. The wireless power receiver of claim 1, wherein:
the first coil has an inductance of about 1µµH to about 20 µH,
the first capacitor has a capacitance of about 0.05 µf to about 2 µF,
the second coil has an inductance of about 1 µH to about 20 pH, and
the second capacitor has a capacitance of about 0.05 µf to about 2 µF.

4. The wireless power receiver of claim 1, wherein the first coil and the second coil are tuned such that electric currents flowing through the first coil and the second coil have a phase difference of less than 20 degrees.

5. A method of transferring power wirelessly to a wireless power receiver comprising:
 a resonant circuit to receive power from a wireless power transmitter via wireless magnetic resonance charging, the resonant circuit comprising:
 a first coil;
 a second coil in series and concentric with the first coil and stacked on the first coil, the first coil and the second coil being physically aligned with the wireless power transmitter and magnetically coupled to a third coil and a fourth coil of the wireless power transmitter;
 a first capacitor coupled in series with the first coil; and
 a second capacitor coupled in parallel with the first coil and the first capacitor,
 wherein:
  the first coil is magnetically coupled to the second coil; and
  the first capacitor and the second capacitor do not act as an open circuit durinq operation of the wireless power receiver,
 the method comprising:
  receiving the power, from the third coil and the fourth coil, with the first coil and the second coil at a resonant frequency between about 80 kHz and about 90 kHz, a voltage gain of about 1.0, and an efficiency of at least 95%.

6. The method of claim 5, further comprising:
 positioning the first coil within about 50 mm of the third coil.

7. The method of claim 5, further comprising:
 running a first current through the third coil and the fourth coil, the first current inducing a second current running through the first coil and the second coil.

8. The method of claim 7, wherein a phase difference between the first current at the third coil and the first current at the fourth coil is less than about 20 degrees.

9. The method of claim 7, wherein a phase difference between the first current at the third coil and the first current at the fourth coil is less than about 10 degrees.

10. A wireless power receiver, comprising:
 a first coil having a first inductance;
 a first capacitor in series with the first coil and having a first capacitance, the first coil and the first capacitor connected together at a first node and forming a first branch of a parallel circuit;
 a second capacitor having a second capacitance and forming a second branch of the parallel circuit that is in parallel with the first branch; and
 a second coil, in series with the parallel circuit and concentric with the first coil, having a second inductance,
 wherein:
  the product of the second capacitance and the second conductance does not equal the product of the first capacitance and a difference of the first inductance and the second inductance; and
  the first coil and the second coil are tuned such that electric currents induced in the first coil and the second coil by the third coil and the fourth coil in the wireless power transmitter have a phase difference of less than 20 degrees.

11. The wireless power receiver of claim 10, wherein the resonant frequency of the wireless power receiver is about 87 kHz.

12. The wireless power receiver of claim 10, wherein the wireless power receiver has a voltage gain of about 1 over a band from about 80 kHz to about 90 kHz.

13. The wireless power receiver of claim 10, wherein the wireless power receiver has a power transfer efficiency of at least 95% over a band from about 80 kHz to about 90 kHz.

14. The wireless power receiver of claim 10, wherein the first coil is co-planar with the second coil.

15. The wireless power receiver of claim 10, wherein the first coil is stacked on the second coil.

16. The wireless power receiver of claim 10, wherein the first coil is a first flat spiral coil and the second coil is a second flat spiral coil.

17. The wireless power receiver of claim 10, wherein the first coil and the second coil have outer diameters equal to or less than 220 mm.

18. The wireless power receiver of claim 10, wherein the first coil is connected to a second node and the second coil is connected to the second node.

19. The wireless power receiver of claim 10, wherein the first capacitor is connected to a second node the second coil is connected to the second node.

20. The wireless power receiver of claim 10, wherein:
 the first coil has an inductance of about 0.1 µH to about 100 µH,
 the first capacitor has a capacitance of about 0.01 µf to about 100 µf,
 the second coil has an inductance of about 0.1 µH to about 100 µH, and
 the second capacitor has a capacitance of about 0.01 µf to about 100 µf.

21. The wireless power receiver of claim 10, wherein:
 the first coil has an inductance of about 1µµH to about 20 µH,
 the first capacitor has a capacitance of about 0.05 µf to about 2 µF,
 the second coil has an inductance of about 1 µH to about 20 pH, and
 the second capacitor has a capacitance of about 0.05 µf to about 2 µF.

22. The wireless power receiver of claim 10, wherein:
 the first coil is magnetically coupled to the second coil; and
 the first coil and the second coil is operable to, when physically aligned with the wireless power transmitter, be magnetically coupled to the third coil and the fourth coil.

23. The wireless power receiver of claim 10, wherein the first coil and the second coil are configured to provide impedance matching to increase a voltage gain at an operating frequency of the wireless power receiver.

* * * * *